(12) United States Patent
Balasubramanian et al.

(10) Patent No.: US 11,304,040 B2
(45) Date of Patent: Apr. 12, 2022

(54) LINKING AN OBSERVED PEDESTRIAN WITH A V2X DEVICE

(71) Applicant: QUALCOMM Incorporated, San Diego, CA (US)

(72) Inventors: Anantharaman Balasubramanian, San Diego, CA (US); Saadallah Kassir, Austin, TX (US); Kapil Gulati, Hillsborough, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/928,995

(22) Filed: Jul. 14, 2020

(65) Prior Publication Data
US 2022/0022013 A1    Jan. 20, 2022

(51) Int. Cl.
| G06K 9/46 | (2006.01) |
| H04W 4/40 | (2018.01) |
| H04W 4/90 | (2018.01) |
| G06K 9/00 | (2022.01) |

(52) U.S. Cl.
CPC .......... *H04W 4/40* (2018.02); *G06K 9/00228* (2013.01); *G06K 9/00362* (2013.01); *G06K 9/00805* (2013.01); *H04W 4/90* (2018.02)

(58) Field of Classification Search
CPC combination set(s) only.
See application file for complete search history.

(56) References Cited

U.S. PATENT DOCUMENTS

| 2011/0221901 A1* | 9/2011 | Bai ...................... H04N 19/115 |
| | | 348/148 |
| 2017/0132855 A1* | 5/2017 | Kim ................. G08G 1/096741 |
| 2019/0049977 A1* | 2/2019 | Dean .................... G05D 1/0278 |

* cited by examiner

*Primary Examiner* — Quan M Hua
(74) *Attorney, Agent, or Firm* — Qualcomm Incorporated

(57) ABSTRACT

Techniques described herein provide for identification of a mobile device that belongs to an observed pedestrian, by a vehicle. According to embodiments, a vehicle can receive a mobile device message including a first set of pedestrian-identifying features, and the vehicle can use vehicle sensor data to extract a second set of pedestrian-identifying features for an observed pedestrian. If the features match, the vehicle can determine that the observed pedestrian is in possession of the mobile device, and the vehicle can subsequently communicate with the mobile device as needed regarding the status of the pedestrian.

30 Claims, 11 Drawing Sheets

LINKING AN OBSERVED PEDESTRIAN WITH A V2X DEVICE

BACKGROUND

Vehicle-to-everything (V2X) is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly-termed road side units (RSUs)), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth generation new radio (5G NR), and/or other cellular technologies in a direct-communication mode as defined by the 3rd Generation Partnership Project (3GPP). A component or device on a vehicle, RSU, or other V2X entity that is used to communicate V2X messages is generically referred to as a V2X device or V2X user equipment (UE).

Vehicles can communicate with one another and nearby mobile devices using V2X. To help V2X-capable vehicles ("V2X vehicles") maneuver safely on the road, V2X vehicles can broadcast information about their current location and intended maneuvers. Mobile devices may also broadcast information about their current location.

BRIEF SUMMARY

Techniques described herein provide for linking of a pedestrian and a mobile device at a vehicle. According to embodiments, a mobile device can provide a first set of pedestrian features to a vehicle. The vehicle can also obtain an image of an external environment, detect an object in the image, determine that the object is an observed pedestrian, and extract information about a second set of pedestrian features from the image. The vehicle can then compare the first set of pedestrian features and the second set of pedestrian features. If the features match, the vehicle can determine that the observed pedestrian is in possession of the mobile device. The vehicle can then communicate with the observed pedestrian by transmitting messages directly to the mobile device.

Figure 1:
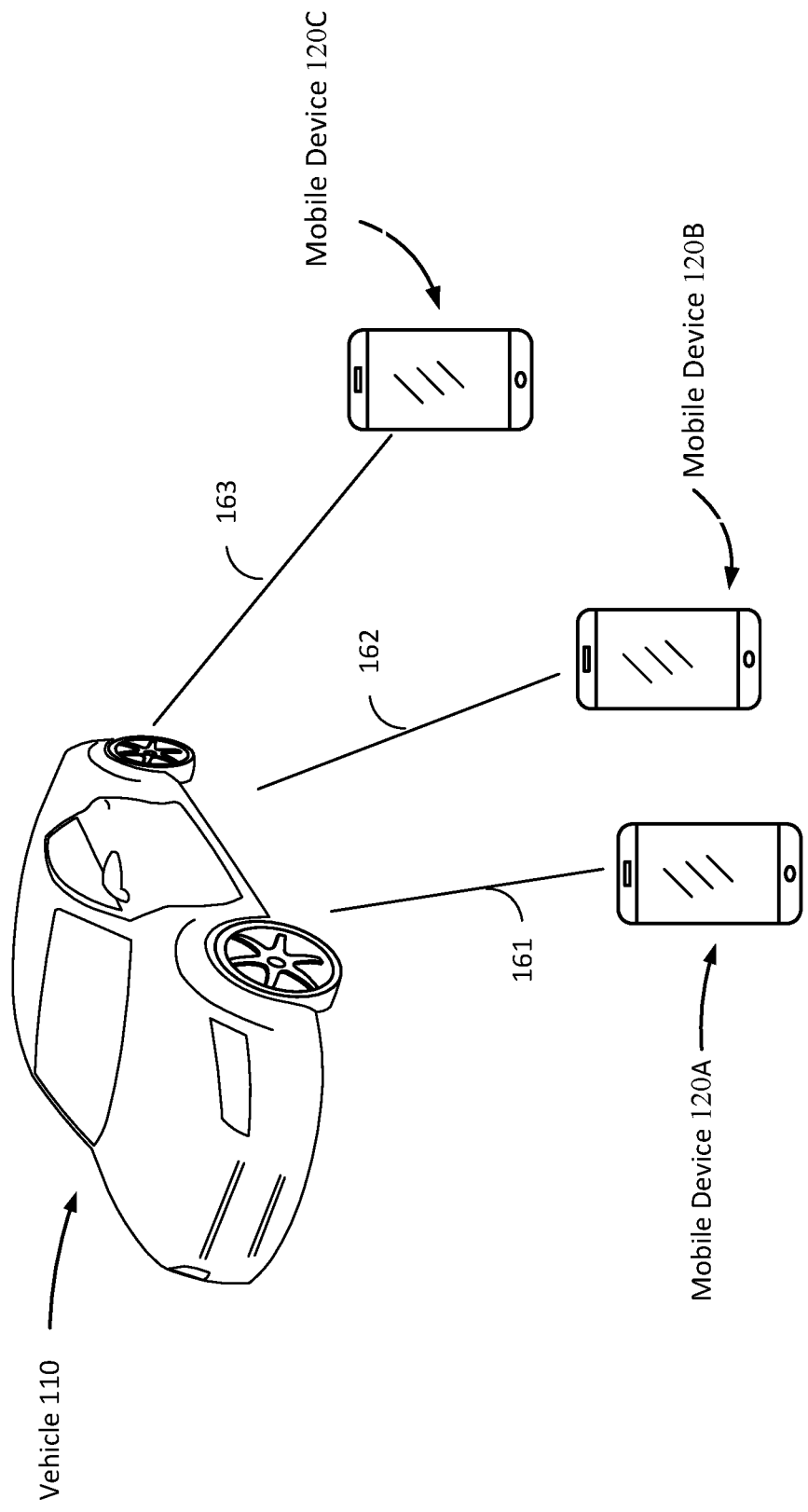
FIG. 1 illustrates an example of a V2X vehicle communicating with pedestrian mobile devices.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

As referred to herein, "V2X devices," "V2X vehicles," and "V2X entities" respectively refer to devices, vehicles, and entities capable of transmitting and receiving V2X messages. Similarly, "non-V2X vehicles" and "non-V2X entities" refer to vehicles and entities that do not or cannot engage in V2X communications. Further, a "V2X device," which is described in more detail herein, refers to a device, system, component, or the like, which may be incorporated into and/or used by a V2X entity to enable V2X communications. Although many embodiments described "V2X vehicles" and "non-V2X vehicles," it will be understood that many embodiments can be expanded to include non-vehicle entities, such as pedestrians, cyclists, road hazards, obstructions, and/or other traffic-related objects, etc. Further, it can be noted that embodiments may apply to vehicles and/or mobile devices capable of traffic-related communication, and not necessarily to V2X-capable vehicles and/or mobile devices. Moreover, although the embodiments provided herein can be executed by autonomous and/or semi-autonomous vehicles, embodiments are not so limited. Embodiments may, for example, include traditional (non-autonomous) vehicles having capabilities for determining and communicating intended maneuvers (e.g., within on-board navigation computer, capable of communicating instructions to a human driver). A person of ordinary skill in the art will appreciate such variations.

Embodiments for linking a mobile device to an observed pedestrian provided herein allow a vehicle to identify which mobile device from a group of nearby mobile devices is possessed by a certain observed pedestrian. This linking process can involve matching two different sets of pedestrian features, one set received from a mobile device and a second set extracted from vehicle sensor data. Once a vehicle has identified a mobile device belonging to a pedestrian, the vehicle can efficiently communicate directly to that pedestrian through the mobile device. This is an improvement over the option of broadcasting to all nearby mobile devices a message intended solely for one pedestrian. As a result, a specific pedestrian can be warned or alerted as necessary. Additionally, a vehicle's collision detection capabilities can be shared with less-capable mobile devices by informing mobile devices when collision may take place.

Typically, vehicles and mobile devices can widely broadcast information (e.g., Basic Safety Messages) about their own trajectories and location to one another. However, mobile device's self-determined location data is often insufficiently accurate (e.g., due to inferior GNSS capabilities at the mobile device). Accordingly, vehicles usually do not rely on received mobile device location data when determining locations of obstacles, and instead rely on other vehicle sensors to identify the locations of external objects.

Vehicle sensors are more accurate and reliable when determining the locations and trajectories of objects in the external environment. However, potential discrepancies between a mobile device's broadcasted location and a vehicle's observation of a nearby pedestrian location prevent matching of nearby mobile devices with observed pedestrians. As a result, the vehicle typically cannot directly contact an observed pedestrian, even in the case when the pedestrian is in possession of a mobile device that is already in communication with the vehicle. The difficulty in matching communicative mobile devices with observed pedestrians is exacerbated further when there are a larger number of nearby pedestrians and mobile devices.

Accordingly, embodiments of the invention solve these problems by matching two sets of pedestrian features. A first set of pedestrian features is broadcasted or otherwise communicated by a mobile device. A second set of pedestrian features is obtained by vehicle sensors. A sufficient match of pedestrian features can indicate that the mobile device which sent the first set of pedestrian features is in the possession of the observed pedestrian from whom the second set of pedestrian features was obtained. As a result, a vehicle can accurately determine the location of a mobile device and can link the mobile device with a specific observed pedestrian, even when the mobile device's own location-determination capabilities are inaccurate.

FIG. 1 illustrates an example of multiple V2X devices in communication. A vehicle 110 can communicate with mobile device 120A, 120B, and 120C using wireless signals 161, 162, and 163. Embodiments of the invention allow any suitable number of vehicles, mobile devices, and other suitable devices to be in communication.

Mobile device 120A, which may comprise a cellular device or other suitable user equipment (UE), can be in the possession of a first pedestrian (not shown). Mobile device 120B can be in the possession of a second pedestrian (not shown) and mobile device 120C can be in the possession of a third pedestrian (not shown). In addition to information regularly shared between V2X devices, the mobile devices 120A-C can provide information about their associated pedestrians.

For example, mobile device 120A can broadcast or otherwise transmit to the vehicle 110 (as well as other vehicles) information about characteristic features of the first pedestrian. This can include one or more images of the some or all of the pedestrian's body (e.g., the pedestrian's face), a description of the pedestrian's gait, one or more pedestrian demographics, clothing styles, shoe styles, a voice recording, or any other suitable data that can be used to distinguish the first pedestrian from other pedestrians. Embodiments allow the pedestrian features to be transmitted alone or as a part of another V2X message, such as a Basic Safety Message.

Mobile device 120B can also transmit information describing features of the second pedestrian to the vehicle 110, and mobile device 120C can also transmit information describing features of the third pedestrian to the vehicle 110. As a result, the vehicle 110 can subsequently use the pedestrian feature information in conjunction with features of pedestrians detected by vehicle sensors to determine which detected pedestrians are in possession of mobile device 120A, mobile device 120B, and mobile device 120C.

The mobile devices 120A-C may broadcast the pedestrian features at regular intervals, or upon request. In some embodiments, the pedestrian feature data is transmitted less frequently than regular V2X messages (e.g., Basic Safety Messages) in order to save bandwidth and power. For example, the pedestrian feature data may be broadcast every 1 second, 5 seconds, 10 seconds, 30 seconds, 1 minute, or any other suitable interval. Embodiments also allow the pedestrian feature information to be broadcast or otherwise transmitted in pieces in order to reduce the size of each message. A first message can include a first portion of the pedestrian feature data, a second message can include a second portion, and so forth.

Figure 2:
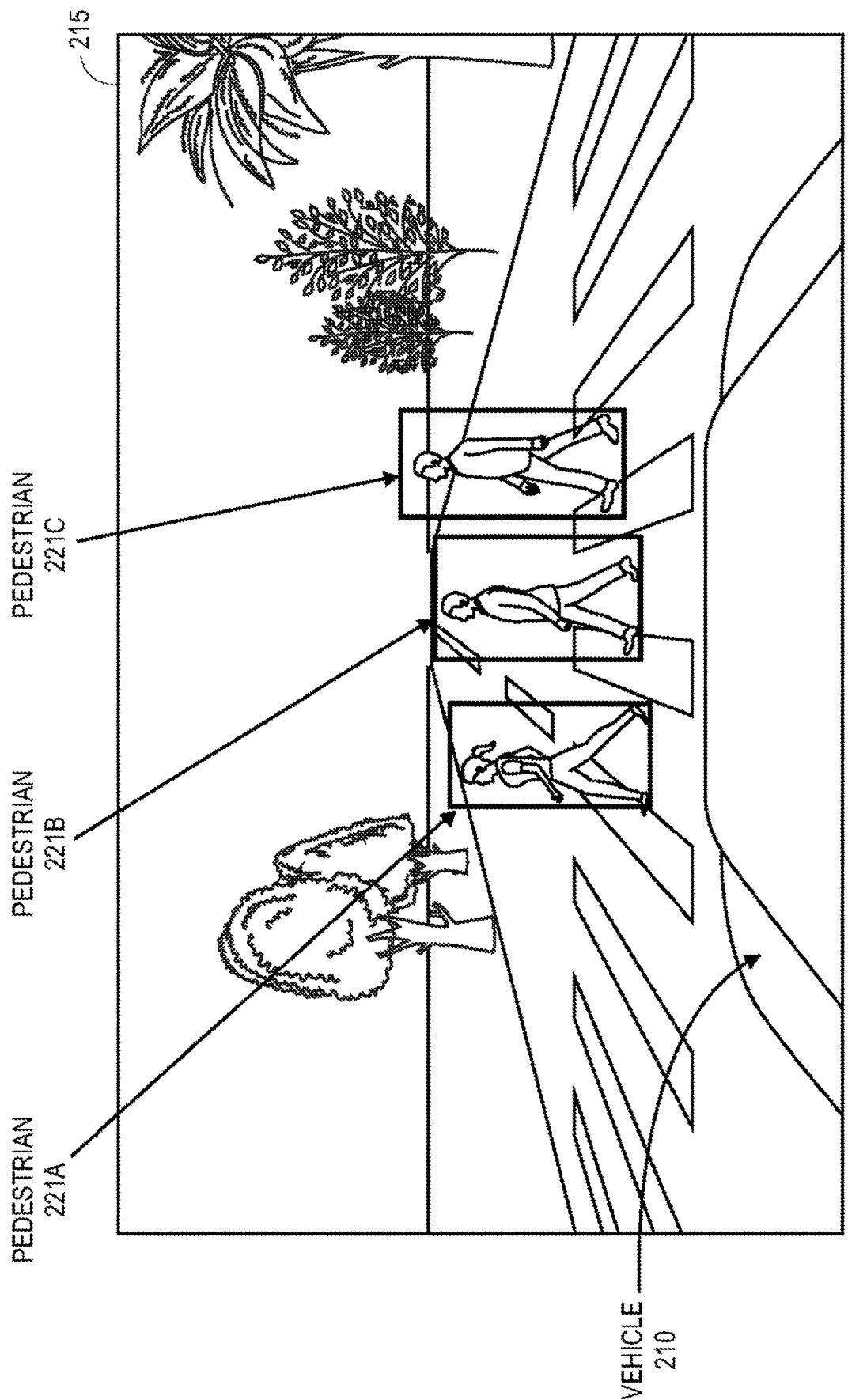
FIG. 2 illustrates an example vehicle camera image of pedestrians observed during travel.

FIG. 2 illustrates an example image 215 of multiple pedestrians as captured by a vehicle camera. As shown, pedestrian 221A, pedestrian 221B, and pedestrian 221C are all walking in a crosswalk in front of the vehicle 210. Embodiments of the invention equally apply to other scenarios where pedestrians are in other locations and engaged in other activities.

The vehicle 210 can use the image 215 to identify how many pedestrians are present, as well as to identify distinguishing features of the pedestrians. For example, the vehicle 210 can isolate an image of a pedestrian's face, or recognize specific facial features (e.g., eye color, nose shape, eye brow size, forehead size, etc.). The vehicle 210 can also determine a pedestrian's body size (e.g., height), body shape, clothing style, clothing color, shoe style, hair style, presence of a hat, hair color, age, demographic information, or any other suitable feature. In some embodiments, the vehicle 210 can capture and analyze multiple images or a video in order to determine a pedestrian's gait or other movement patterns.

Each of the pedestrians in the image 215 may be in possession of a mobile device. Accordingly, the vehicle 210 may be able to communicate with a specific pedestrian by messaging the correct mobile device. However, it may not be immediately apparent which mobile device belongs to which pedestrian.

Figure 4:
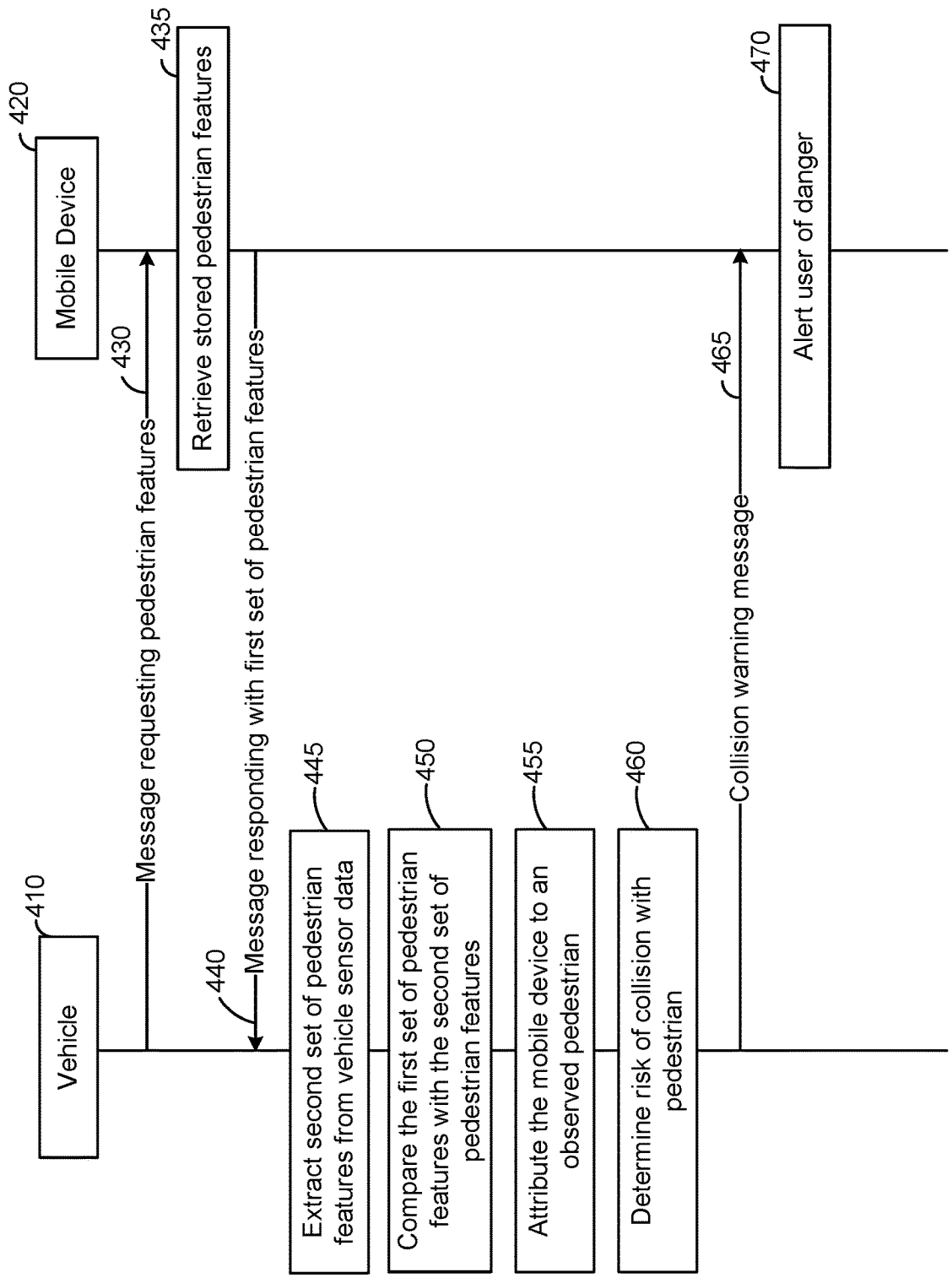
FIG. 4 is an additional call flow diagram illustrating an alternative embodiment with a variation in the communications between a vehicle and a mobile device when determining which mobile device is associated with a certain pedestrian.
Figure 5:
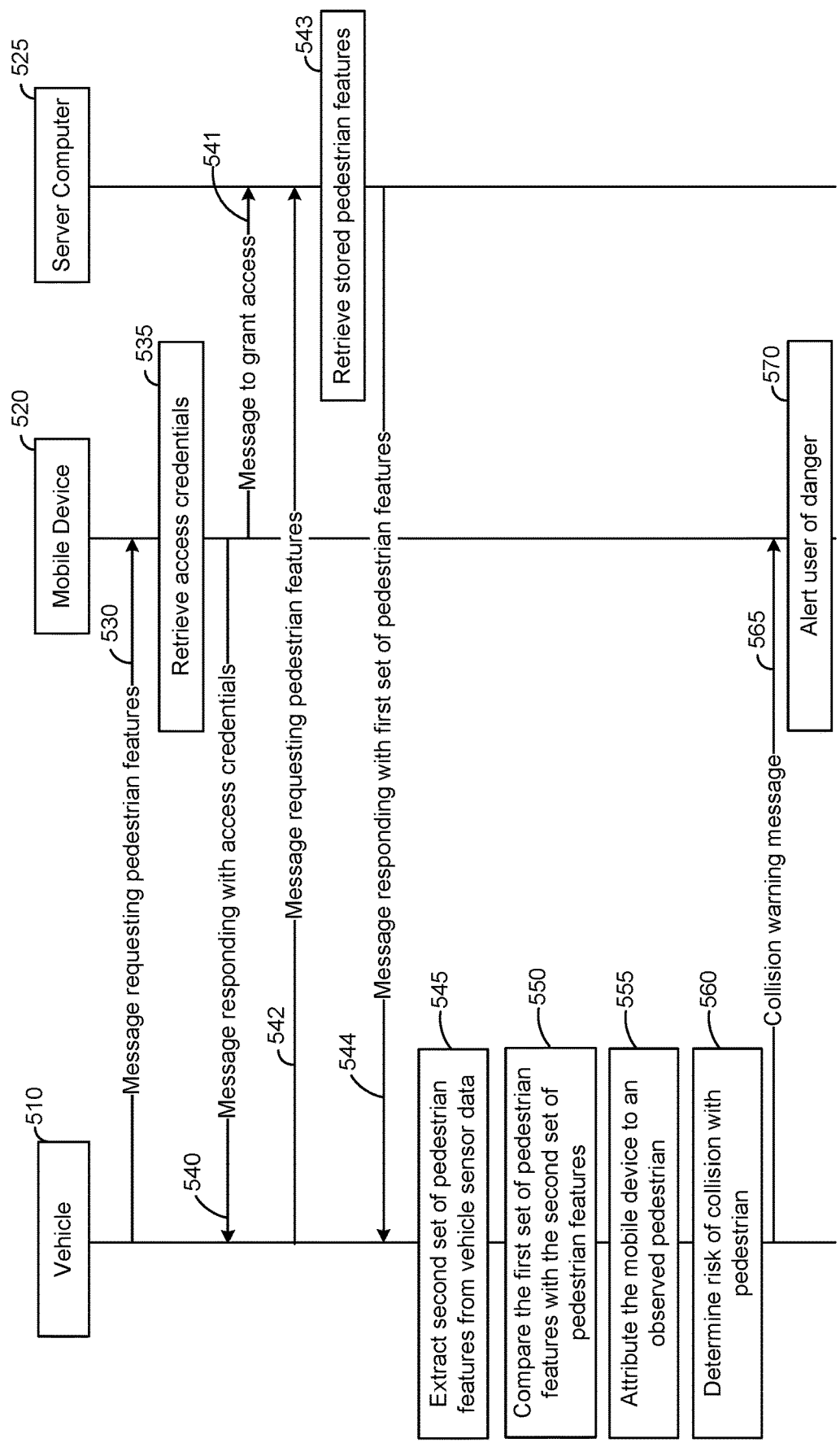
FIG. 5 is a further call flow diagram illustrating a further embodiment with a further variation in the communications between a vehicle and a mobile device when determining which mobile device is associated with a certain pedestrian.

Embodiments allow the vehicle 210 to match one or more of the observed pedestrians 221A-C in FIG. 2 with one or more of the identified mobile devices 120A-C in FIG. 1. The vehicle 210 can compare the pedestrian feature information received from the mobile devices 120A-C with the pedestrian feature information extracted from the image 215 to identify pedestrian feature matches. A match can indicate that a specific observed pedestrian is in possession of a specific mobile device. Processes of matching observed pedestrians with communicative V2X devices, according to some embodiments, are illustrated in FIGS. 3-5.

Figure 3:
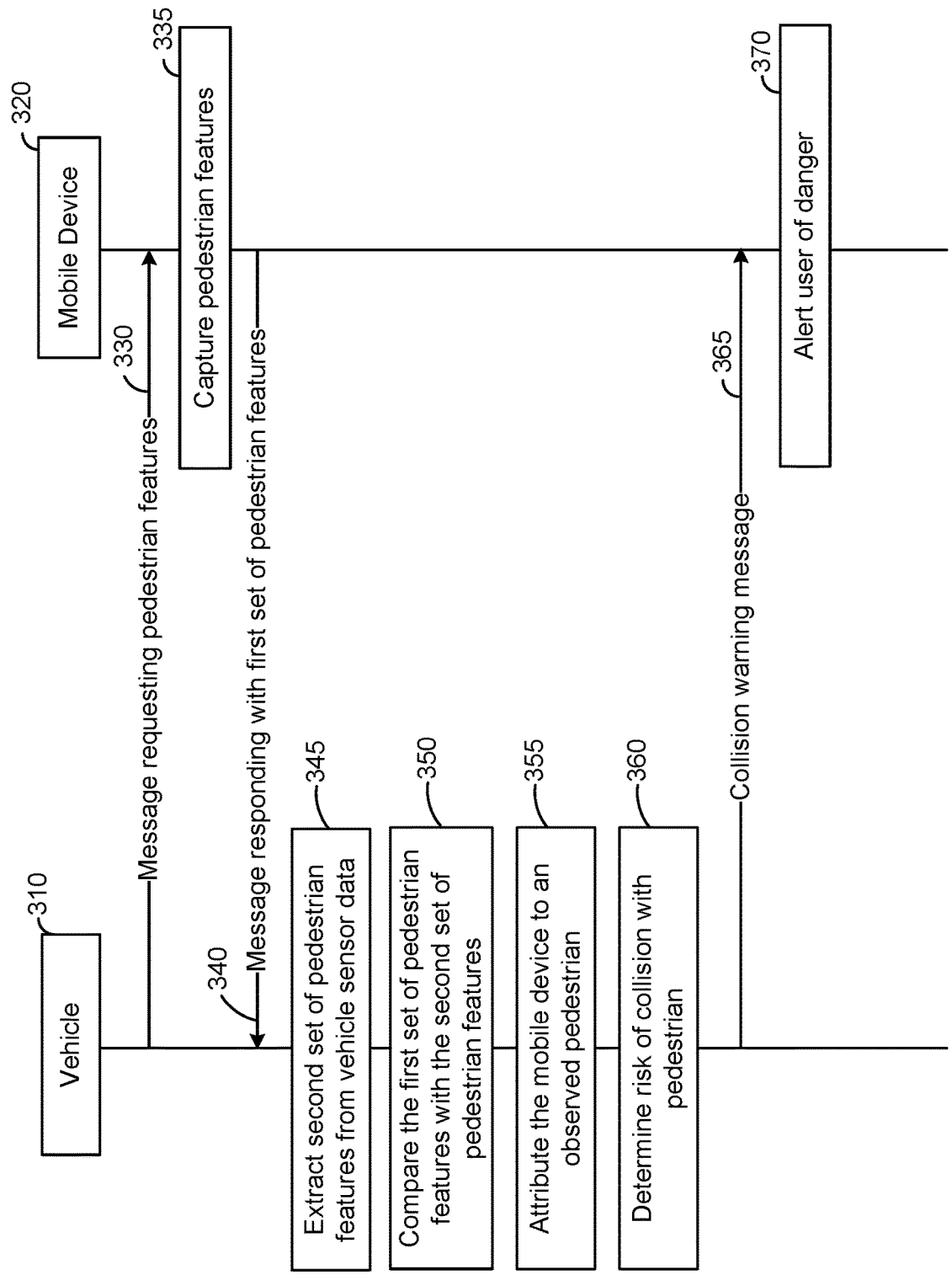
FIG. 3 is a call flow diagram illustrating the basic functions and communication between a vehicle and a mobile device when determining which mobile device is associated with a certain pedestrian, according to some embodiments.
Figure 8:
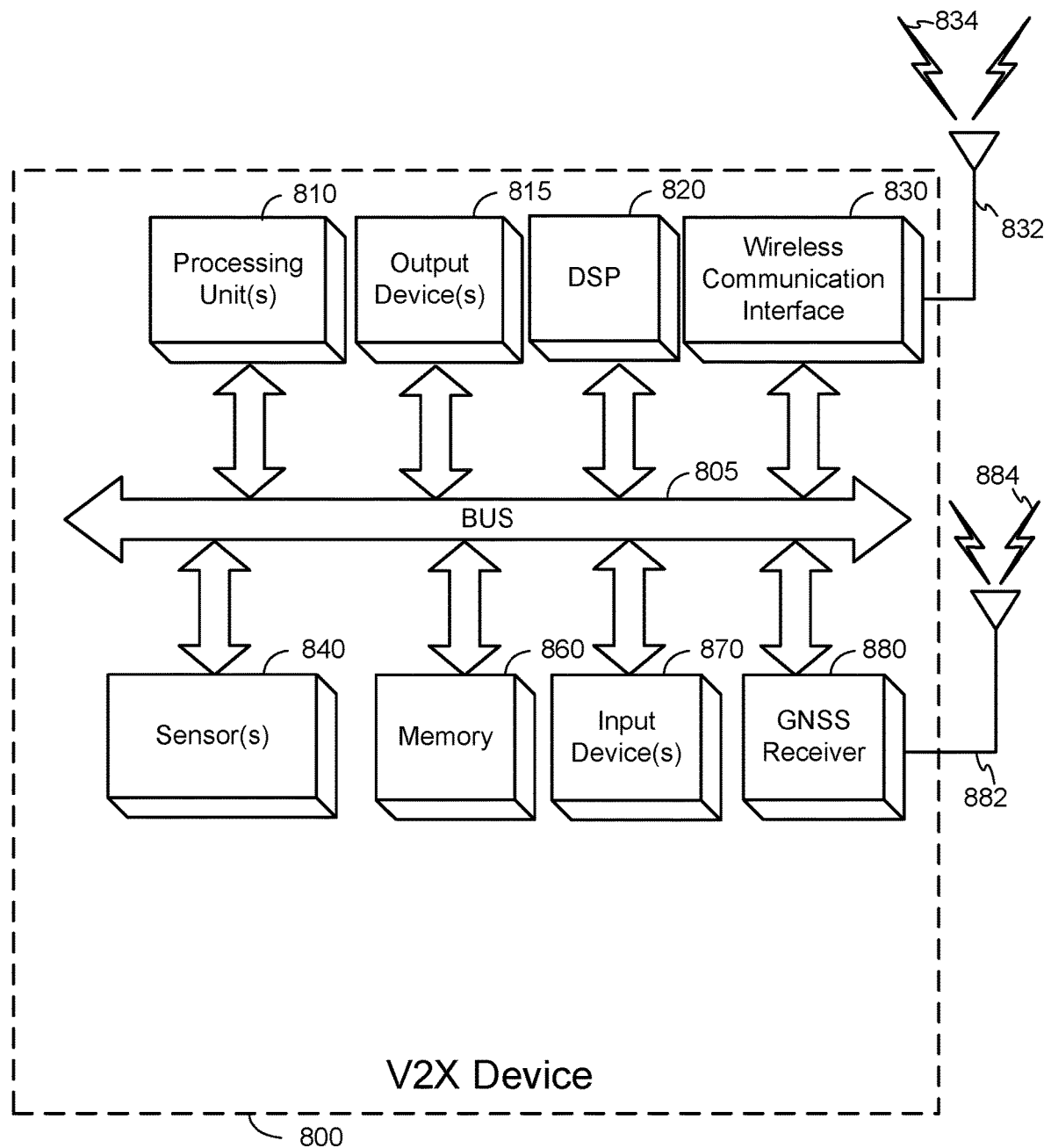
FIG. 8 is block diagram of an embodiment of a V2X device.

FIG. 3 is a call flow diagram illustrating the basic functions and communication between a vehicle 310 and a mobile device 320 when linking a mobile device 320 to a pedestrian, according to an embodiment. The functions of the blocks illustrated in FIG. 3 attributed to a vehicle 310 or mobile device 320 may be performed by a V2X device of the respective vehicle 310 or mobile device 320. Software and/or hardware components of a V2X device are illustrated in FIG. 8 and discussed herein below.

Initially, the mobile device 320 may receive a message with a request for pedestrian feature information (shown by arrow 330) from the vehicle 310. In some embodiments, the message can include a request for a specific type of pedestrian feature information (e.g., facial data, gait data, demographics, height and weight, voice data).

The message may also comprise information regularly shared between V2X devices. This can include, for example, a Basic Safety Message (BSM), Cooperative Awareness Messages (CAM), or similar message, which may be broadcast by the vehicle 310. Additionally or alternatively, the mobile device 320 may receive direct communication from the vehicle 310 comprising messages requesting pedestrian feature information and/or mobile device 320 information. The vehicle 310 may also transmit similar messages to additional mobile devices.

In response to receiving the request from the vehicle 310, the mobile device 320 can, as shown at block 335, capture a set of pedestrian feature data using mobile device sensors for providing to the vehicle 310. For example, if a mobile device 320 camera is currently oriented toward the user (e.g., if the user is currently interacting with the mobile device 320), the mobile device 320 can capture a real-time image of the pedestrian's face, head, or other suitable part of the user's body. Embodiments allow the mobile device 320 to measure and/or capture any suitable pedestrian features, such as measure the user's gait, voice, height, size, clothing colors, clothing styles, style of glasses or other eyewear, presence and style of hat or helmet, etc.

The mobile device 320 may determine that a certain type or types of pedestrian feature(s) are requested by the vehicle. In some embodiments, the mobile device 320 can proceed to obtain the requested types of features. Alternatively or additionally, the mobile device 320 can obtain other pedestrian features. For example, the mobile device's user may prefer to provide types of features considered less personal, such as a gait or jacket color instead of a facial image, in order to protect the user's privacy. The mobile device 320 can, in some embodiments, choose a privacy level, and feature types can be automatically selected based on the indicated privacy level.

In some embodiments, the mobile device 320 may provide raw feature information, such as one or more unmodified images. This can include images in a JPEG format, a PNG format, a GIF format, or any other suitable format. In other embodiments, the mobile device 320 may not provide raw feature information, but may instead provide convoluted or otherwise modified data. For example, the mobile device 320 may convolute or encode a facial image before transmitting the image data to the vehicle 310. The mobile device 320 may utilize a convolutional filter configuration, stride size, and/or pool configuration as indicated by the vehicle in step 330 or as determined based on the viewing conditions (e.g., ambient light, weather, time of day). Data convolution and modifications can advantageously protect a pedestrian's privacy, as well as reduce the size of the message transmitted by the mobile device 320.

Some embodiments can include additional techniques for protecting user privacy and limiting the types and amount of personal user information collected by the mobile device 320 and/or shared with the vehicle 310. For example, a certain mobile device 320 may elect or be configured to provide only a subset of pedestrian features. This can include, for example, providing images of or information related to some facial features (e.g., a facial shape and/or size) but not providing images of or information related to other facial features (e.g., eyes and/or nose).

Further embodiments allow different mobile devices have different privacy settings. For example, a first mobile device may be configured to provide a first set more sensitive pedestrian features (e.g., facial image data and/or gait data) to the vehicle 310, while a second mobile device may be configured to withhold a similar first set of more sensitive pedestrian features (e.g., facial image data and/or gait data), and may instead only provide a second set of less sensitive pedestrian features (e.g., current clothing colors and body height).

In some embodiments, different mobile devices may communicate with one another to determine what type of pedestrian features to provide to the vehicle 310. For example, two or more mobile devices can send one or more messages inquiring about what pedestrian features to provide, suggesting one or more pedestrian features, and/or confirming suggestions of one or more pedestrian features. As an example, three mobile device may determine, as a group, to provide a set of pedestrian features that includes an image of an eye. Then, the mobile device 320 can differentiate observed pedestrians based on recognizing different eyes (e.g., color, shape, etc.) and linking observed eyes with eye images received from each mobile device. Additionally or alternatively, the mobile devices may determine to send different types of pedestrian features. For example, a first mobile device may send an eye image, a second mobile device may send a facial image, and a third mobile device may send gait information (e.g., via a video of the pedestrian walking).

In some embodiments, different user mobile devices can determine what type of pedestrian features to send by identifying what type of pedestrian feature is suitable for distinguishing a specific set of pedestrians. For example, three pedestrians may all be the same or similar height, but they may have different color clothing. Accordingly, it may be better to send clothing color information to the vehicle 310 instead of height information. In another example, three mobile devices can communicate with one another about one or more pedestrian features of their associated pedestrians, compare various types of features, and then determine that a facial image is better suited than a gait for differentiating the pedestrians. This may be due to three pedestrians having similar gaits, but dissimilar faces (e.g., different color eyes, different sized noses, different facial outline, etc.). Embodiments, allow any suitable type of distinction to be used, such as sending eye data instead of nose data, hair style data instead of hair color data, ear type data instead of jawline data, etc.

The mobile device 320 can then send one or more messages responding with a first set of pedestrian feature information to the vehicle 310, as shown by arrow 340. In some embodiments, the message can include an indication as to what type of pedestrian feature information is included in the message, and if/how the data has been modified.

The message may also contain a current location of the mobile device 320, a mobile device identifier (e.g., a phone number or V2X device identifier), and/or other suitable information. Additionally, the message may further comprise information regularly shared between V2X devices. This can include, for example, a Basic Safety Message (BSM), Cooperative Awareness Messages (CAM), or similar message, which may be broadcast by the mobile device 320.

Additionally or alternatively, the vehicle 310 may receive direct communication from the mobile device 320 comprising messages with pedestrian feature information and/or mobile device 320 information. The mobile device 320 may also transmit similar information to other vehicles, and the vehicle 310 may also receive similar messages with different pedestrian features from other mobile devices.

Upon receiving the first set of pedestrian features from the mobile device 320, the vehicle 310 can store the information in a database so that it can be used for comparison with other pedestrian features obtained using vehicle sensors.

The vehicle 310 can also obtain other pedestrian features from another sources. For example, the vehicle 310 can obtain an image, and the vehicle 310 can identify whether the image contains one or more objects corresponding to one or more pedestrians. Using this information, the vehicle 310 can then determine whether the mobile device 320 is associated with a pedestrian based on the first set of pedestrian features and the one or more objects corresponding to one or more pedestrians. The following steps describe this process in more detail, according to embodiments of the invention In some embodiments, the vehicle 310 can receive the image from a Road Side Unit (RSU) or a different mobile device, either of which may have captured an image of a pedestrian passing by. Embodiments allow the image to be obtained from any other suitable source, such as one or more vehicle sensors. Various vehicle sensors can continuously monitor the external environment, and the vehicle 310 can use one or more vehicle sensors to detect objects. For example, a camera can capture images of the environment surrounding the vehicle 310. The vehicle 310 can then detect an object present in an image, and can perform object recognition to determine that the object is a pedestrian. The vehicle 310 can identify multiple pedestrians within an image.

As shown at block 345, the vehicle 310 can then extract features of an identified pedestrian from the sensor data. For example, the vehicle 310 can extract a facial image or other body image a pedestrian identified in the image of the surrounding environment. Embodiments allow any suitable type of pedestrian features and characteristics to be extracted, such as eye color, hair color, forehead shape, clothing style, height, body shape, gait (e.g., from video input), walking speed, etc.

The vehicle 310 may modify the pedestrian feature information for comparison with the data received from the mobile device 320. For example, the vehicle 310 may convolute or encode a facial image, or may isolate information about specific features of a facial image (e.g., eye color, lip size, or cheek bone structure data). The vehicle 310 may utilize a convolution layer, stride size, and/or pool configuration as previously indicated by the vehicle in step 330, as indicated by the mobile device 320 in step 340, or as determined based on the viewing conditions (e.g., ambient light, weather, time of day).

Now having both a first set of pedestrian feature information as received from the mobile device 320 in step 340 and a second set of pedestrian feature information as extracted from vehicle sensor data by the vehicle in step 345, the vehicle 310 can compare the two sets of pedestrian feature information, as shown at block 350. In some embodiments, multiple first sets of different pedestrian feature information received from multiple mobile devices can be compared with multiple second sets of different pedestrian feature information for different observed pedestrians in order to find any possible matches.

The vehicle 310 can then determine whether the first set of pedestrian feature information and a second set of pedestrian feature information match. For example, the vehicle 310 can determine whether a first set of facial image data matches a second set of facial image data within a predefined confidence level or threshold. Embodiments allow a match to be determined if one or more specific facial features match (e.g., a nose shape, eye color, cheek bone size, etc.), if specific gait features match, if clothing colors or styles match, or if any other suitable pedestrian features match.

In some situations, features that uniquely identify the pedestrian may not be necessary. For example, if there are only a few pedestrians nearby, they may be separately identifiable based on clothing color or height, and data considered more private or sensitive, such as facial images, may not be needed to find a match.

In the case that a match is determined, the vehicle 310 can attribute the mobile device 120 to the observed pedestrian, as shown in box 355. For example, the mobile device 320 may be recognized as belonging to the observed pedestrian or otherwise be carried or used by the observed pedestrian.

When a match is determined, the vehicle 310 can now directly contact the observed pedestrian via messages to the mobile device 320. For example, in cases where it is better to contact only a specific pedestrian as opposed to broadcasting messages to all nearby devices, the vehicle 310 knows with which specific mobile device 320 to communicate. In effect, the vehicle 310 can link together two previously disassociated sources of information; mobile device 320 message information and vehicle sensor information.

In one example where it is advantageous to contact a specific pedestrian instead of broadcasting a message to all nearby devices, the vehicle 310 may determine that it is on a collision course with a specific pedestrian observed in one or more camera images, as shown at block 360. For example, the pedestrian may be walking on the sidewalk, and unaware that they are veering toward the road. In addition to or instead of taking evasive maneuvers, the vehicle 310 may also determine to transmit a warning message to the mobile device 320.

Accordingly, the vehicle 310 can identify which nearby mobile device 320 is associated with the observed pedestrian in danger (e.g., via database lookup). In some embodiments, the steps for matching the observed pedestrian with a mobile device 320 (e.g., steps 345-355) may take place after the vehicle 310 determines to send a message to the pedestrian.

The vehicle 310 can then send one or more notification messages to the mobile device 320, the message including information about an impending or possible collision, as shown by arrow 365. The message can include any suitable information, such as the approximate time to collision, the direction of the danger, a suggested direction for the pedestrian to move toward, description of the danger (e.g., vehicle color, size, model), etc.

The mobile device 320 can then alert the pedestrian, as shown by box 370. In some embodiments, the mobile device 320 can play an audible alarm, provide haptic feedback (e.g., vibration), display a warning message and/or flash the display on and off, and/or otherwise inform the pedestrian of the possible collision. As an example, the mobile device 320 can display a message with the words "Watch out!" accompanied with an arrow pointing in the direction of oncoming danger.

This advantageously allows a pedestrian to be informed and involved in self-rescue, as opposed to relying solely on the vehicle 310 to avoid the collision. The vehicle 310 typically has more sensors than the mobile device 320, is more actively tracking movements of itself and other objects, and is thereby better able to determine when a collision may take place. Accordingly, embodiments enable the mobile device 320 to utilize the vehicle's advanced collision detection abilities. Additionally, false alarms can be avoided by only contacting the correct pedestrian instead of broadcasting the message to multiple pedestrians.

Embodiments of the invention allow direct messages to be sent in other scenarios as well. For example, the vehicle 310 may send a message to the mobile device 320 in order to inform the pedestrian that they dropped an item, that their backpack is unzipped, that they are in possible danger from another vehicle or another pedestrian, that they appear to be distracted (e.g., reading text messages) in a busy area, or for any other suitable communicative purpose.

Beyond camera sensors for capturing images, embodiments allow other vehicle sensors to be used for detecting objects and extracting pedestrian features as well. For example, a microphone can detect audio signals, and a pedestrian's voice can be identified from within the audio signals.

In some embodiments, the first set of pedestrian features and the second set of pedestrian features can include multiple types of pedestrian features. For example, a set of pedestrian features can include facial image data, a gait, body height, and a clothing color. Certain types of pedestrian features can be prioritized and used for comparison before others. For example, a facial image may be utilized first, as it may more reliably identify a pedestrian. However, if a facial image is not available (e.g., not provided by the mobile device), or if facial image data is incomplete (e.g., not enough facial features shown), corrupted, or otherwise insufficient for comparison, the vehicle may instead utilize a lower priority type of feature, such as a gait.

In some environments, there may only be one nearby pedestrian and/or mobile device 320. For example, the vehicle 310 may only observe one pedestrian, only one mobile device 320 may be within short-range communication range or within a threshold distance from the vehicle 310, and/or the mobile device's reported location may be within a threshold distance (e.g., 5 meters, 10 meters, 15 meters) of the location of the observed pedestrian. In this case, it may not be necessary to go through the process of comparing pedestrian feature data to match the pedestrian to the mobile device 320. Instead, the vehicle 310 may assume that the single observed pedestrian is in possession of the single nearby mobile device 320, and can proceed to communicate with the pedestrian through the mobile device 320. Further, in some embodiments, the vehicle 310 may initiate the process in FIG. 3 only after determining that there is an ambiguity condition, such as multiple observed pedestrians, multiple communicative mobile devices, an observed pedestrian not being within a threshold distance of a location reported by a mobile device 320, and/or any other suitable situation where it is not apparent that a certain mobile device 320 is carried by a certain observed pedestrian.

In some embodiments, the pedestrian feature information may be insufficient for differentiating two or more observed pedestrians. For example, two different sets of pedestrian features of two different pedestrians received from two different mobile devices may both match the second set of pedestrian features extracted from the observed pedestrian sensor data (e.g., the data obtained at block 345). In another example, none of the receives sets of pedestrian features (e.g., from one or more mobile devices) may be considered a match with the second set of pedestrian features extracted from the sensor data. This could be due to facial recognition or other image-comparison techniques determining that two compared sets of pedestrian features do not match above a certain pre-defined threshold. These and other situations may cause a failure to link an observed pedestrian with a communicative mobile device. In situations where the vehicle 310 cannot disambiguate observed pedestrians or otherwise link observed pedestrians with nearby mobile devices, the vehicle 310 may be configured to broadcast messages more widely. Instead of sending a message to one mobile device, the vehicle 310 may send the message to multiple or all nearby mobile devices. For example, a warning message which may be intended for a specific pedestrian can be broadcast to one or more mobile devices that are currently in communicative range of the vehicle 310, to one or more mobile devices that are currently determined to be near the vehicle 310 based on their self-declared current locations, and/or to one or more mobile devices that have not been positively linked to other pedestrians (e.g., in the case where some pedestrian-device connections have been identified while others have not). In this way, the warning message can still reach the intended pedestrian even if the pedestrian's specific mobile device is unknown.

The description herein primarily refers to mobile device users as pedestrians. However, embodiments of the invention allow other types of objects to be recognized and communicated with through mobile devices. For example, bicyclists, skateboarders, other vehicles, stationary objects, and any other suitable type of object can be recognized based on observable features and thereby linked with a mobile device 320.

FIG. 4 is another call flow diagram illustrating a variation to the basic functions and communication shown in FIG. 3, in the case where a mobile device 420 provides stored pedestrian feature data, according to an embodiment. Again, the functions of the blocks illustrated in FIG. 4 attributed to a vehicle 410 or mobile device 420 may be performed by a V2X device of the respective vehicle 410 or mobile device 420. Software and/or hardware components of a V2X device are illustrated in FIG. 8 and discussed herein below.

Here, the message(s) requesting pedestrian feature data (arrow 430) echo corresponding functions shown in FIG. 3. Here, however, instead of obtaining real-time pedestrian features, the mobile device 420 retrieves a stored pedestrian feature data, as shown at block 435.

For example, the mobile device 420 may capture pedestrian feature data at an earlier time, so that it can be readily retrieved and utilized when needed at a later time. This can be advantageous for situations when the mobile device 420 is unable to capture pedestrian feature data in real-time. For example, if facial image data is to be used, but the mobile device 420 is not currently oriented toward the user's face (e.g., the mobile device 420 is in the user's pocket), then the mobile device 420 cannot capture a real-time image. Instead, the mobile device 420 can provide stored facial image data that was previously captured at an earlier time.

After retrieving the pedestrian feature data, the mobile device 420 can send one or more messages responding with pedestrian feature information to the vehicle 420, as shown by arrow 440. In some embodiments, the message can include an indication as to what type of pedestrian feature information is included in the message.

The remaining method steps can echo corresponding functions shown in FIG. 3. For example, the extraction of a second set of pedestrian features from vehicle sensor data (box 445), the comparison of pedestrian feature data (box 450), the attribution of the mobile device 420 to an observed pedestrian (box 455), the determination that there is a risk of collision with the pedestrian (box 460), the transmitting of a message to the specific mobile device 420 for a specific pedestrian (arrow 465), and alerting the user of danger (box 470) can all echo corresponding functions shown in FIG. 3.

FIG. 5 is another call flow diagram illustrating a variation to the basic functions and communication shown in FIG. 3, in the case where a mobile device 520 provides an access credential instead of directly providing pedestrian feature data, according to an embodiment. Again, the functions of the blocks illustrated in FIG. 5 attributed to a vehicle 510 or mobile device 520 may be performed by a V2X device of the respective vehicle 510 or mobile device 520. Software and/or hardware components of a V2X device are illustrated in FIG. 8 and discussed herein below.

Here, the message(s) requesting pedestrian feature data (arrow 530) echo corresponding functions shown in FIG. 3. Here, however, instead of obtaining pedestrian features and sending a message including to pedestrian features to the vehicle 510, the mobile device 520 retrieves or generates an access credential, as shown at block 535.

For example, the mobile device 520 may provide access credentials for accessing pedestrian feature information that is stored at a server computer 525. The access credentials can include login information such as a username and password, an authentication key, a digital certificate, a temporary access code, and/or any other suitable information for accessing pedestrian features associated with a mobile device 520 and stored at a remote server computer 525. In some embodiments, the access credentials can provide access to a social media account of the pedestrian, the account including images of the pedestrian. Alternatively, user authentication services or other any other suitable database can be utilized.

This can be advantageous for reducing the message payload, as access credentials are typically less data than images and other forms of pedestrian feature data. As a result, messages can be sent between the vehicle 510 and the mobile device 520 more easily, more quickly, and more frequently without impacting network traffic or power consumption.

Accordingly, the mobile device 520 can send a message with access credentials to the vehicle 520, as shown by arrow 540. In some embodiments, the message can include additional information about how to use the access credentials to obtain pedestrian feature data. For example, the message can indicate a website address or other identification of a server computer or authentication service where the access credentials can be used.

Additionally, in some embodiments, the mobile device 520 may send a message to the server computer 525, as shown by arrow 541. The message can notify the server computer 525 that a vehicle 510 is about to request access to a user account and/or stored pedestrian features. The message may instruct the server computer 525 to grant access to the vehicle 510. In some embodiments, the message can include information about the vehicle 510, such as a V2X device identifier, or other vehicle identification information such as a VIN or license plate number. Additionally, the message can include a copy of the access credentials (e.g., a temporary code or key) or any other suitable information to verify that the vehicle 510 is permitted access to the stored pedestrian feature data.

Upon receiving the access credentials from the mobile device 520, the vehicle 510 can proceed to communicate with the server computer 525. The vehicle 510 may send a message with a request for pedestrian feature information to the server computer 525, as shown in arrow 542. The message can include the access credentials, a mobile device identifier, and/or any other suitable information for identifying and accessing the correct set of pedestrian features.

The server computer 525 can then determine whether to provide access to the vehicle 510. For example, the server computer 525 can attempt to authenticate the access credentials. If authentication is successful (e.g., access credentials are valid and not expired), the server computer 525 can identify a stored set of pedestrian features associated with the mobile device 520 and/or access credentials, as shown in box 543. Then, the server computer 525 can transmit a message with the pedestrian feature information (e.g., multiple images of the user's face and/or body taken from different angles, videos of the user walking, etc.) to the vehicle 510, as shown in arrow 544. If authentication is not successful, the server computer 525 may reject the request for the pedestrian features, and may transmit a message to the vehicle 510 to inform that access was denied.

The remaining method steps can echo corresponding functions shown in FIG. 3. For example, the extraction of a second set of pedestrian features from vehicle sensor data (box 545), the comparison of pedestrian feature data (box 550), the attribution of the mobile device 520 to an observed pedestrian (box 555), the determination that there is a risk of collision with the pedestrian (box 560), the transmitting of a message to the specific mobile device 520 for a specific pedestrian (arrow 565), and alerting the user of danger (box 570) can all echo corresponding functions shown in FIG. 3.

In some embodiments, a mobile device location can be measured and/or refined using signal-based timing measurements such Round-Trip-Time, Time Of Arrival (TOA), and/or signal strength of a broadcast signal. Additionally or alternatively, location of nearby mobile devices may be determined from sensor measurements such as LIght Detection And Ranging (LIDAR), RAdio Detection And Ranging (RADAR), SOund Navigation And Ranging (SONAR), NR sidelink positioning communications, Ultra-Wideband (UWB) range measurements, and camera measurements. Accordingly, some embodiments allow a vehicle to measure a mobile device's location (as opposed to inaccurate mobile device location data received from a mobile device), and thereby connect a mobile device with an observed pedestrian based on a comparison of the measured mobile device location and the observed pedestrian's location (e.g., without matching other pedestrian features).

In further embodiments, multiple mobile devices can interact with one another to determine their locations relative to one another and/or one or more vehicles. This can provide more accurate relative location data than, for example, GPS measurements taken by each mobile device individually. In one example, one or more mobile devices and/or vehicles can determine relative positions and/or orientations through NR sidelink positioning communications, UWB range measurements, and/or any other suitable technology. As a result, one or more mobile devices can provide better mobile device location data to a vehicle, and the vehicle can link the mobile device location with the observed location of a pedestrian. A vehicle can thereby connect a mobile device with an observed pedestrian based on a comparison of the measured mobile device location and the observed pedestrian's location (e.g., in addition to or instead of matching other pedestrian features).

In some embodiments, instead of providing absolute location data, one or more mobile devices may provide relative location data. For example, one or more mobile devices can determine that a first mobile device is located further East relative to a second mobile device. A third mobile device may be located furthest to the North relative to both the first and second mobile devices (e.g., 10 meters north of the first mobile device, and 15 meters north of the second mobile device). As a result, mobile devices can identify a set of neighboring mobile devices and determine their relative locations. This set of neighboring mobile devices can be provided (e.g., by one or more of the mobile devices) to one or more vehicles. A vehicle can then analyze its own sensor data to determine relative locations of one or more observed pedestrians. The relative locations of observed pedestrians can be compared with the received relative locations of neighboring devices to determine which pedestrian is associated with which mobile device. For example, a first observed pedestrian that is located further East, relative to a second observed pedestrian, can be linked with the first mobile device that is located further East relative to the second mobile device. Relative positioning disambiguation of this sort can happen for a group of any suitable number of mobile devices. Additionally, embodiments allow this relative positioning to be used to disambiguate mobile devices (and link mobile devices with pedestrians) without other pedestrian feature data, or alternatively the relative position data can be used in conjunction with pedestrian feature data to more confidently link mobile devices and observed pedestrians.

In some embodiments, one or more mobile devices can determine their relative locations based on an instruction from a vehicle. For example, a vehicle can determine when assistance is needed and inform the mobile devices, such as when mobile devices cannot be disambiguated based on observed pedestrian feature data (e.g., the data is unavailable or insufficient), or based on a mobile device's GPS data (e.g., the data is unavailable or insufficient).

Embodiments allow relative positioning determinations to take place by communications between and measurements by both mobile devices and vehicles. Alternatively, a group of mobile devices can determine their relative positions without interacting with vehicles, and then afterward can provide their determined positions to one or more vehicles.

In some embodiments, some or all of the functionality described above for the vehicle and/or the mobile device can instead be performed by a road side unit (RSU). For example, an RSU may perform some functions instead of and/or on behalf of the vehicle, such as receiving a first set of pedestrian features from a mobile device, taking images of pedestrians, obtaining a second set of pedestrian features, matching an observed pedestrian with a determining if a pedestrian is in danger, and/or sending a warning message to a mobile device in order to alert a pedestrian. As a result, an RSU can communicate with, monitor the environment, and/or send warnings to pedestrians through specific mobile devices instead of or in addition to nearby vehicles.

As another example, an RSU may perform some functions instead of and/or on behalf of the mobile device, such as obtaining a first set of pedestrian features (e.g., through sensors in real-time, or pre-stored pedestrian feature data), providing the first set of pedestrian features to one or more vehicles, and/or receiving a warning message from a vehicle and then alerting a pedestrian. In some embodiments, an RSU can warn a pedestrian by forwarding the message to a mobile device. Additionally or alternatively, the RSU can use other tools to communicate with the pedestrian, such as a light-up sign, actuating a barrier (e.g., to block movement), or any other suitable mechanism.

Figure 6:
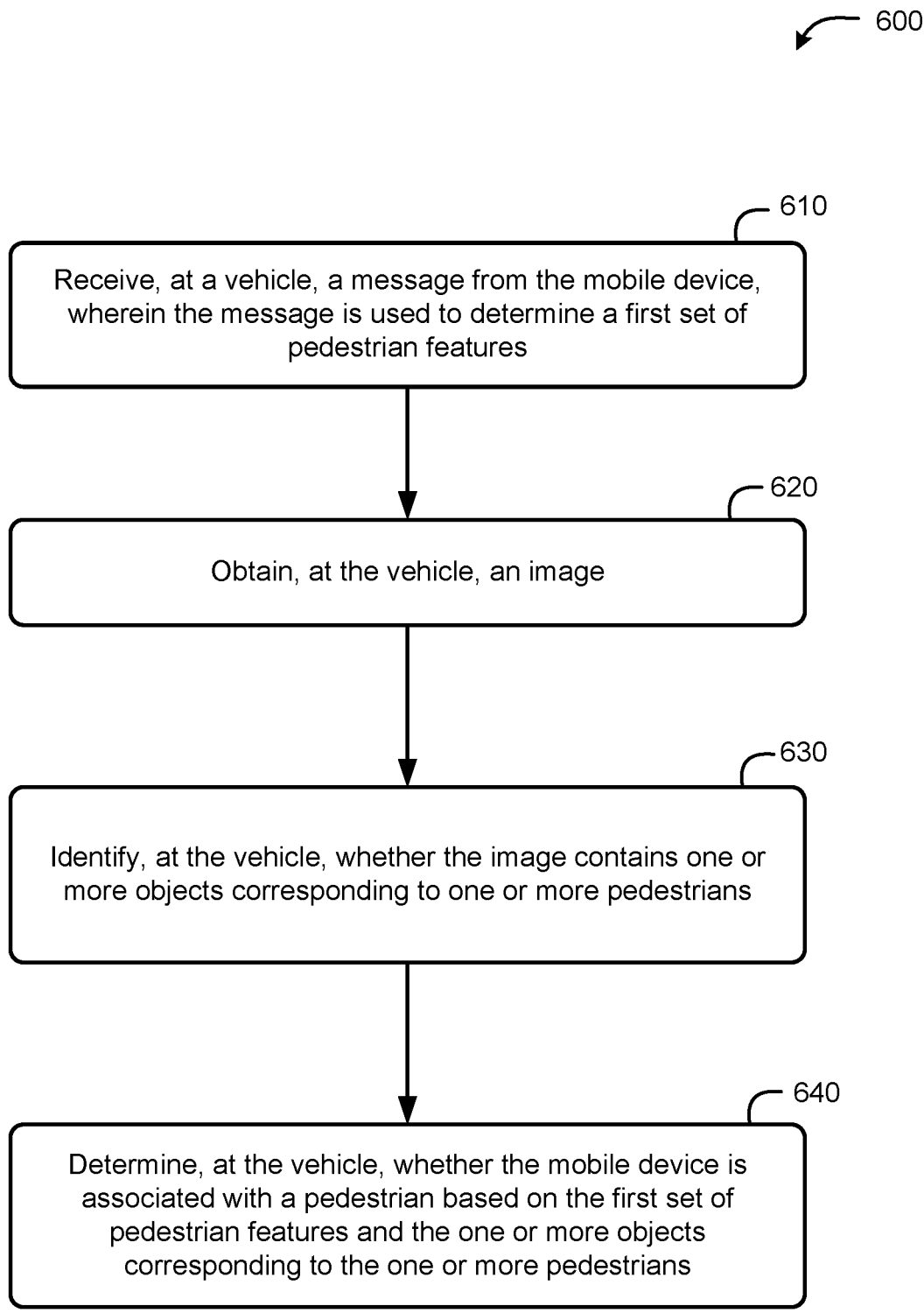
FIGS. 6 and 7 are flow diagrams of methods of linking an observed pedestrian with a nearby mobile device, according to some embodiments.

FIG. 6 is a flow diagram of a method 600 of linking a pedestrian and a mobile device by a vehicle, according to an embodiment. The functions illustrated in the blocks of FIG. 6 may be performed by a vehicle when determining which pedestrians and/or mobile devices are associated. As such, the functions in one or more of the blocks illustrated in FIG. 6 may be one way to implement the functionality illustrated in FIG. 3, FIG. 4, and/or FIG. 5, from the perspective of the vehicle 310, 410, and/or 510.

At block 610, the functionality comprises receiving, at the vehicle, a message from the mobile device, wherein the message is used to determine a first set of pedestrian features. (Here, the vehicle may correspond to the vehicle 310 of FIG. 3, the vehicle 410 of FIG. 4, and/or the vehicle 510 of FIG. 5.). As noted in the embodiments described previously, these messages may comprise BSM, CAM, and/or other messages routinely sent between vehicles and/or mobile devices in a V2X environment. For embodiments that do not take place in V2X environments, similar messages may be used. Alternatively, according to some embodiments, messages may be sent to between vehicles and/or mobile devices via direct communications (e.g., rather than via broadcast).

As noted, the message used to determine a first set of pedestrian features can take different forms and the determination can happen in various manners. In one instance, the message can include parameters captured in real-time. As such, some embodiments of the method 600 may further comprise sending, from the vehicle, to the mobile device, a request for the first set of pedestrian features, wherein the mobile device captures the first set of pedestrian features in response to receiving the request, and wherein the message received from the mobile device includes the first set of pedestrian features.

Additionally or alternatively, the message can include parameters that are stored by the mobile device. For example, some embodiments of the method 600 may further comprise sending, from the vehicle, to the mobile device, a request for the first set of pedestrian features, wherein the first set of pedestrian features is stored at the mobile device, wherein the mobile device retrieves the first set of pedestrian features in response to receiving the request, and wherein the message received from the mobile device includes the first set of pedestrian features.

Further additionally or alternatively, the message can include information that can be used to obtain the parameters. For example, some embodiments of the method 600 may further comprise sending, from the vehicle, to the mobile device, a first request for the first set of pedestrian features, wherein the message received from the mobile device is received after sending the first request, and wherein the message includes access credentials for obtaining the first set of pedestrian features. The method 600 may further comprise, in response to receiving the access credentials, sending, from the vehicle, to a server computer, a second request for the first set of pedestrian features, the second request including the access credentials. The method 600 may further comprise, after sending the first request, receiving, at the vehicle, from the server computer, a second message including the first set of pedestrian features.

Means for performing the functionality shown at block 610 may comprise software and/or hardware components of a V2X device, such as a bus 805, processing unit(s) 810, DSP 820, wireless communication interface 830, memory 860, and/or other components of the V2X device 800 illustrated in FIG. 8 and described in more detail below.

At block 620, the functionality comprises obtaining, at the vehicle, an image. As noted, obtaining an image can comprise receiving an image from a camera sensor of the vehicle. Additionally or alternatively, an image can be received from another devices, such as a Road Side Unit (RSU).

Means for performing the functionality shown at block 620 may comprise software and/or hardware components of a V2X device, such as a bus 805, processing unit(s) 810, DSP 820, memory 860, and/or other components of the V2X device 800 illustrated in FIG. 8 and described in more detail below.

At block 630, the functionality comprises identifying, at the vehicle, whether the image contains one or more objects corresponding to one or more pedestrians. As noted, identifying whether the image contains one or more objects corresponding to one or more pedestrians can be accomplished through object recognition technology. For example, some embodiments of the method 600 may further comprise detecting, at the vehicle, the one or more objects in the image. The method 600 may further comprise performing, at the vehicle, object recognition of the one or more objects. Some embodiments many also comprise, in response to performing object recognition of the one or more objects, determining, at the vehicle, that the one or more objects correspond to one or more pedestrian.

At block 640, the functionality comprises determining, at the vehicle, whether the mobile device is associated with a pedestrian based on the first set of pedestrian features and the one or more objects corresponding to the one or more pedestrians.

As noted, determining whether the mobile device is associated with a pedestrian can be accomplished through various comparison steps. As such, some embodiments of the method 600 may further comprise, in response to determining that the one or more objects correspond to one or more pedestrians, extracting, by the vehicle, a second set of pedestrian features corresponding from the image. The method 600 may further comprise comparing, at the vehicle, the first set of pedestrian features and the second set of pedestrian features.

As noted, the pedestrian features can take various forms. For example, in some embodiments, the first set of pedestrian features comprises first facial image data, and the second set of pedestrian features comprises second facial image data. Further, in some embodiments, the second facial image data is convoluted image data. Alternatively or additionally, in some embodiments, the first set of pedestrian features comprises first gait data, and the second set of pedestrian features comprises second gait data.

As noted, the vehicle can communicate with the pedestrian through the mobile device. For example, the method 600 may further comprise determining, at the vehicle, a pedestrian status of the pedestrian and a vehicle status of the vehicle. The pedestrian status can be considered when evaluating environmental situations. For example, the method 600 may further comprise determining, at the vehicle, based on the pedestrian status and the vehicle status, that the pedestrian is in danger. The vehicle can take one or more actions based on a determination that the pedestrian is in danger. For example, the method 600 may further comprise, in response to determining that the pedestrian is in danger, sending, from the vehicle, a warning message to the mobile device.

Means for performing the functionality shown at block 670 may comprise software and/or hardware components of a V2X device, such as a bus 805, processing unit(s) 810, DSP 820, wireless communication interface 830, memory 860, and/or other components of the V2X device 800 illustrated in FIG. 8 and described in more detail below.

Figure 7:
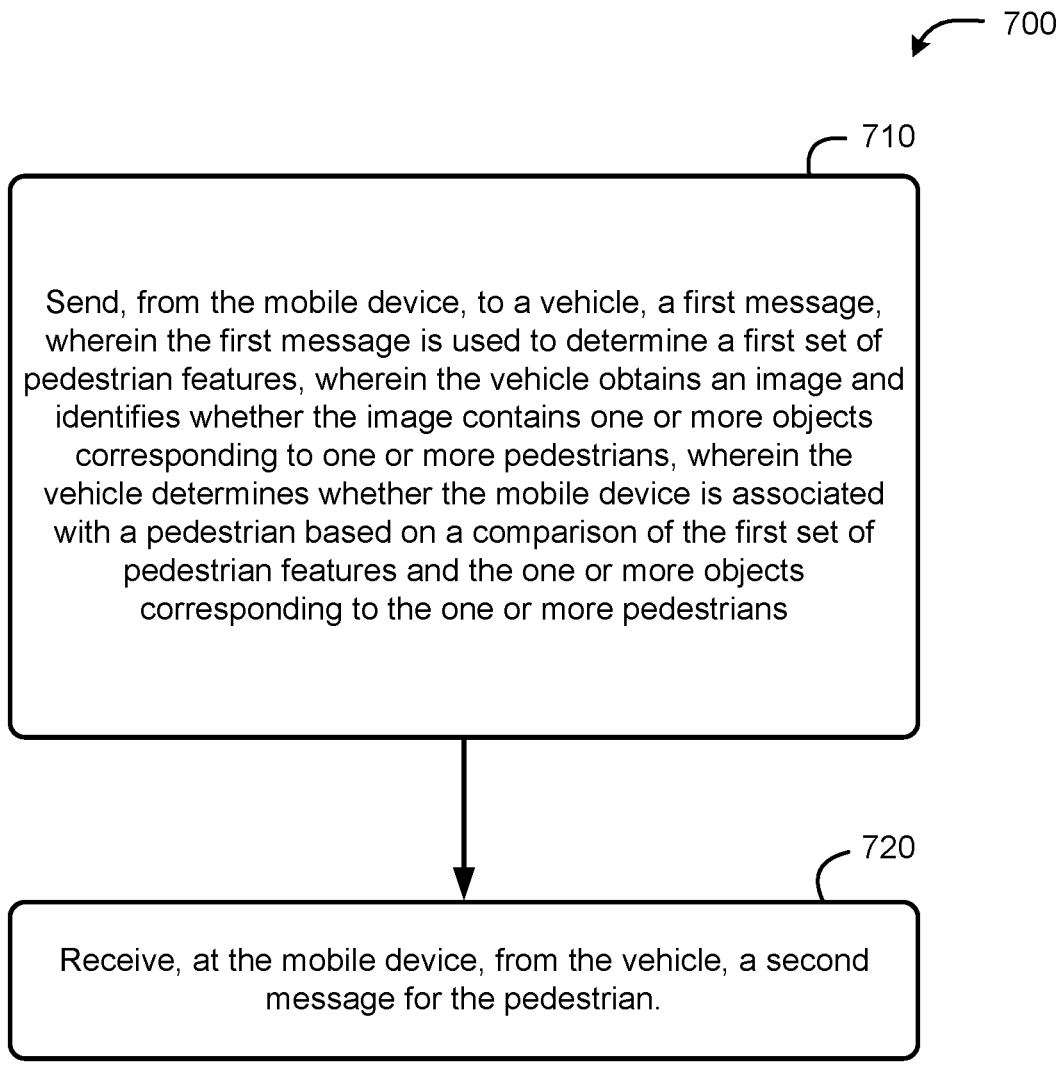

FIG. 7 is a flow diagram of a method 700 of providing information for linking a pedestrian and a mobile device, according to an embodiment, according to an embodiment. The functions illustrated in the blocks of FIG. 7 may be performed by a mobile device in communication with a vehicle. As such, the functions in one or more of the blocks illustrated in FIG. 7 may be one way to implement the functionality illustrated in FIG. 3, FIG. 4, and/or FIG. 5, from the perspective of the mobile device 320, 420, and/or 520.

At block 710, the functionality comprises sending, from the mobile device, to a vehicle, a first message, wherein the first message is used to determine a first set of pedestrian features, wherein the vehicle obtains an image and identifies whether the image contains one or more objects corresponding to one or more pedestrians, wherein the vehicle determines whether the mobile device is associated with a pedestrian based on a comparison of the first set of pedestrian features and the one or more objects corresponding to the one or more pedestrians. (Here, the mobile device may correspond to the mobile device 320 of FIG. 3, the mobile device 420 of FIG. 4, and/or the mobile device 520 of FIG. 5.). As noted in the embodiments described previously, this message may comprise BSM, CAM, and/or other messages routinely sent between vehicles and/or mobile devices in a V2X environment. For embodiments that do not take place in V2X environments, similar messages may be used. Alternatively, according to some embodiments, messages may be sent between vehicles and/or mobile devices via direct communications (e.g., rather than via broadcast).

As noted, the mobile device may send the message in response to a request from the vehicle. As such, some embodiments of the method 600 may further comprise receiving, at the mobile device, from the vehicle, a request for the first set of pedestrian features.

As noted, the first message can take different forms. In one instance, the message can include parameters captured in real-time. As such, some embodiments of the method 600 may further comprise capturing, by the mobile device, the first set of pedestrian features in response to receiving the request, wherein the first message includes the first set of pedestrian features.

Additionally or alternatively, the message can include parameters that are stored by the mobile device. For example, some embodiments of the method 600 may further comprise, in response to receiving the request, retrieving, by the mobile device, the first set of pedestrian features, wherein the first set of pedestrian features is stored at the mobile device, and wherein the first message includes the first set of pedestrian features.

Further additionally or alternatively, the message can include information that can be used to obtain the parameters. For example, some embodiments of the method 600 may further comprise, generating or retrieving, by the mobile device, access credentials for obtaining the first set of pedestrian features, wherein the first message is sent to the vehicle in response to receiving the first request, and wherein the first message includes the access credentials. The vehicle then sends a second request for the first set of pedestrian features to a server computer, the second request including the access credentials. The vehicle then receives the first set of pedestrian features from the server computer.

Means for performing the functionality shown at block 710 may comprise software and/or hardware components of a V2X device, such as a bus 805, processing unit(s) 810, DSP 820, wireless communication interface 830, memory 860, and/or other components of the V2X device 800 illustrated in FIG. 8 and described in more detail below.

At block 720, the functionality comprises receiving, at the mobile device, from the vehicle, a second message for the pedestrian. As noted, in some embodiments, the vehicle then determine a pedestrian status of the pedestrian and a vehicle status of the vehicle. In additional embodiments, the vehicle further determine, based on the pedestrian status and the vehicle status, that the pedestrian is in danger. Further, in some embodiments, the second message for the pedestrian is a warning message sent by the vehicle in response to determining that the pedestrian is in danger.

Means for performing the functionality shown at block 720 may comprise software and/or hardware components of a V2X device, such as a bus 805, processing unit(s) 810, DSP 820, wireless communication interface 830, memory 860, and/or other components of the V2X device 800 illustrated in FIG. 8 and described in more detail below.

FIG. 8 is a block diagram of an embodiment of a V2X device 800, which may be utilized by and/or integrated into a vehicle, a mobile device, a road side unit (RSU), or any other system or device to wirelessly communicate with vehicles and/or mobile devices as previously described. When utilized by a vehicle, the V2X device 800 may comprise or be integrated into a vehicle computer system used to manage one or more systems related to the vehicle's navigation and/or automated driving, as well as communicate with other onboard systems and/or other traffic entities. When utilized by a mobile device, the V2X device 800 may cause the mobile device to, among other things, provide pedestrian features in the manner described in relation to FIGS. 1-5.

Moreover, the V2X device 800 may be integrated into an RSU computer system, which may include additional components and may perform additional RSU-related functionality. Such RSU-related functionality and additional components of an RSU are described in more detail below with regard to FIG. 9. With this in mind, according to some embodiments, the V2X device 800 may comprise a stand-alone device or component of a vehicle, mobile device, or RSU, which may be communicatively coupled with other components/devices of the vehicle, mobile device, or RSU. It also can be noted that the V2X device 800 may be utilized in the similar manner by V2X entities other than a vehicle, mobile device, or RSU. Additionally, embodiments may not necessarily be limited to V2X communications. As such, alternative embodiments may include a device similar to the V2X device 800, having similar components to those shown in FIG. 8 and capable of performing the functions of the vehicles, mobile devices, and/or RSU described in the previously-discussed embodiments, but without V2X functionality.

It should also be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be located, for example, at different physical locations on a vehicle, mobile device, RSU, or other V2X entity.

The V2X device 800 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processing (DSP) chips, graphics acceleration processors, application-specific integrated circuits (ASICs), and/or the like), and/or other processing structure or means.

The V2X device 800 also can include one or more input devices 870, which can include devices related to user interface (e.g., a touch screen, touchpad, microphone, button(s), dial(s), switch(es), and/or the like) and/or devices related to navigation, automated driving, and the like. Similarly, the one or more output devices 815 may be related to interacting with a user (e.g., via a display, light emitting diode(s) (LED(s)), speaker(s), etc.), and/or devices related to navigation, automated driving, and the like.

The V2X device 800 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like. (Examples of such communication are provided in FIG. 9 and described in more detail below.) The wireless communication interface 830 can enable the V2X device 800 to communicate to other V2X devices. This can include the various forms of communication of the previously-described embodiments, including the messaging illustrated in FIGS. 4A, 4B, and 5. And as such, it may be capable of transmitting direct communications, broadcasting wireless signals, receiving direct and/or broadcast wireless signals, and so forth. Accordingly, the wireless communication interface 830 may be capable of sending and/or receiving RF signals from various RF channels/frequency bands. Communication using the wireless communication interface 830 can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof.

The V2X device 800 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensors 840 may be used, for example, to determine certain real-time characteristics of the vehicle, such as location, motion state (e.g., velocity, acceleration, etc.), and the like, as well as characteristics of observed pedestrians, such as location, motion state, identifiable features (e.g., facial image data, gait, other visible and audible features), and the like. As previously indicated, sensor(s) 840 may be used to help a vehicle determine its location.

Embodiments of the V2X device 800 may also include a Global Navigation Satellite System (GNSS) receiver 880 capable of receiving signals 884 from one or more GNSS satellites using an antenna 882 (which, in some embodiments, may be the same as antenna 832). Positioning based on GNSS signal measurement can be utilized to determine a current location of the V2X device 800, and may further be used as a basis to determine the location of a detected object. The GNSS receiver 880 can extract a position of the V2X device 800, using conventional techniques, from GNSS satellites of a GNSS system, such as Global Positioning System (GPS) and/or similar satellite systems.

The V2X device 800 may further comprise and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the V2X device 800 also can comprise software elements (not shown in FIG. 8), including an operating system, device drivers, executable libraries, and/or other code, such as one or more application programs, which may comprise computer programs provided by various embodiments, and/or may be designed to implement methods and/or configure systems as described herein. Software applications stored in memory 860 and executed by processing unit(s) 810 may be used to implement the functionality of a vehicle or RSU as described herein. Moreover, one or more procedures described with respect to the method(s) discussed herein may be implemented as code and/or instructions in memory 860 that are executable by the V2X device 800 (and/or processing unit(s) 810 or DSP 820 within V2X device 800), including the functions illustrated in the methods of FIGS. 6 and 7. In an aspect, then, such code and/or instructions can be used to configure and/or adapt a general-purpose computer (or other device) to perform one or more operations in accordance with the described methods.

Figure 9:
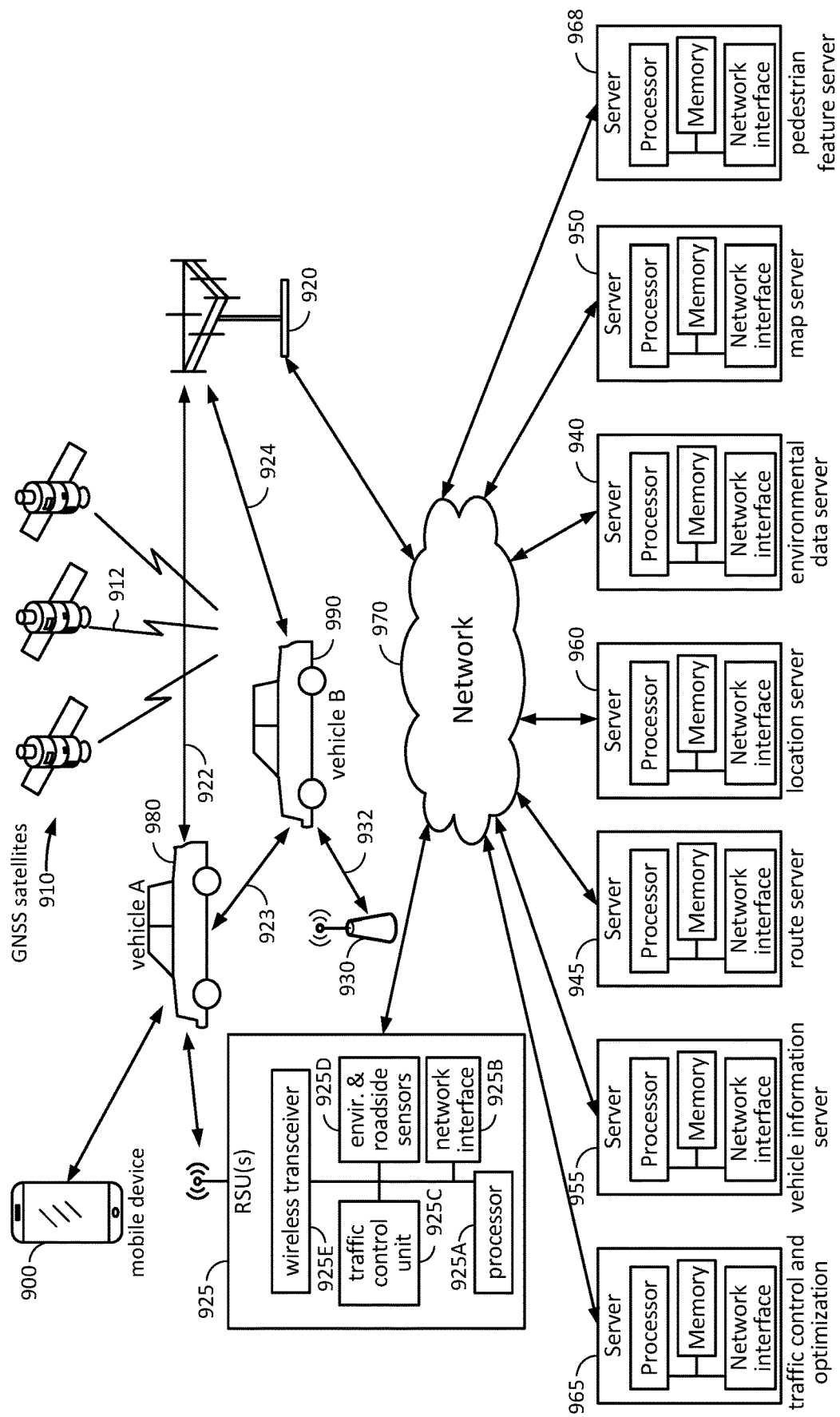
FIG. 9 is a diagram of a system in which vehicles may communicate over various networks and with various devices, vehicles, and servers, according to an embodiment.
Figure 10:
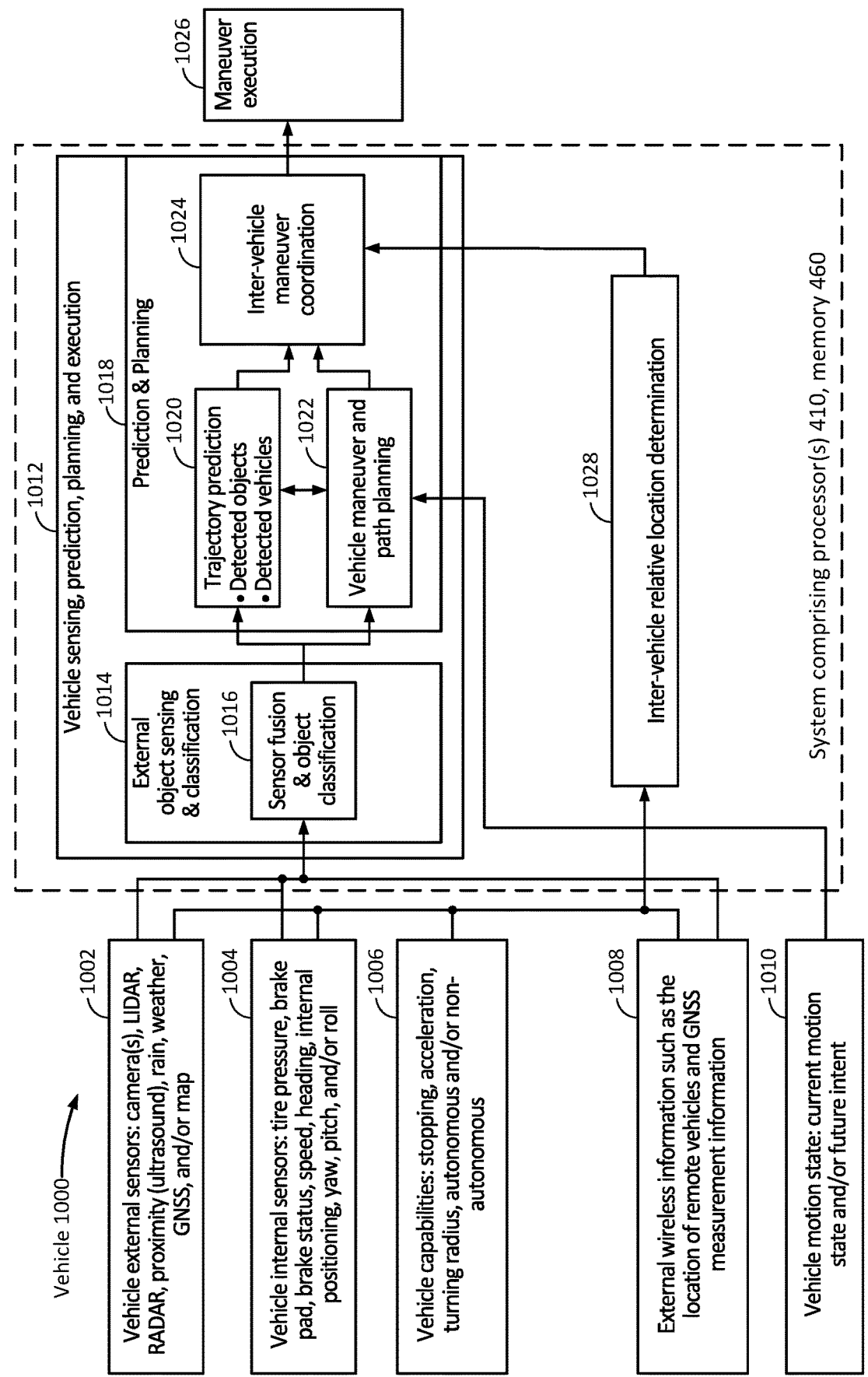
FIG. 10 is a functional block diagram of a vehicle, according to an embodiment.
Figure 11:
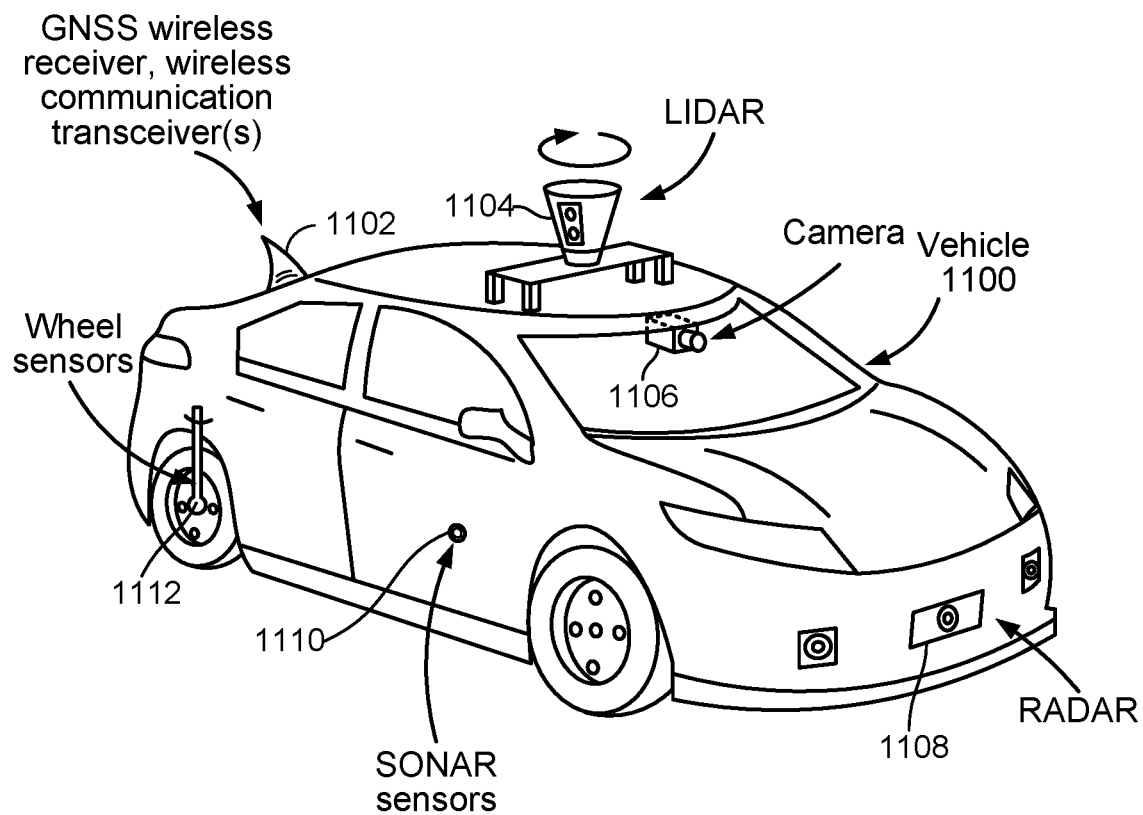
FIG. 11 is a perspective view of an example vehicle, according to an embodiment.

FIGS. 9-11 are illustrations of systems, structural devices, vehicle components, and other devices, components, and systems related to V2X communications, which can be used to implement the techniques provided herein for coordination of vehicle maneuvers among a plurality of vehicles, according to some embodiments. It can be noted that some components in these figures (e.g., mobile device(s) 900 and vehicles 980, 990, 1000, 1100) may correspond to like components in the previously-described embodiments and figures (e.g., mobile device and vehicle).

FIG. 9 is an illustration of a system in which vehicles may communicate over various networks and with various devices, vehicles, and servers, according to an embodiment. In an embodiment, V2X vehicle A 980 may communicate with V2X or otherwise communication-transceiver-enabled vehicle B 990 and/or mobile device 900, using V2X or other wireless communication transceiver over link 923. Some embodiments may, for example communicate to perform inter-vehicle relative positioning, negotiation for lane changes, for passage through an intersection, and/or to exchange V2X data elements such as GNSS measurements, vehicle status, vehicle location and vehicle abilities, measurement data, and/or calculated status. Such communications may additionally or alternatively be used to exchange other V2X vehicle status steps that may not be covered in the V2X capability data elements.

In some embodiments, vehicle A 980 may also communicate with vehicle B 990 and/or mobile device 900 through a network. This can be done using wireless signals 924 to/from base station 920 and/or via wireless signals 932 to/from an access point 930. Additionally or alternatively, such communication can be done via one or more communication-enabled RSU(s) 925, any of which may relay communication, information, and/or convert protocols for use by other vehicles, such as vehicle B 990. This latter functionality can be done, for example, in an embodiment where vehicle B 990 is not capable of communicating directly with vehicle A 980 in a common protocol. In an embodiment, RSU(s) 925 may comprise various types of roadside beacons, traffic and/or vehicular monitors, traffic control devices, and location beacons. Moreover, as noted earlier, RSU(s) 925 may include components of a V2X device 800 as illustrated in FIG. 8 (which may be used in addition or as an alternative to the components of the RSU(s) 925 illustrated in FIG. 9, which are described below).

In an embodiment, RSU(s) 925 may have a processor 925A configured to operate wireless transceiver 925E to send and receive wireless messages, for example, a BSM, CAM, or other V2X messages to/from vehicle A 980, vehicle B 990, and/or mobile device 900 from base station 920 and/or access point 930. For example, wireless transceiver 925E may send and/or receive wireless messages in various protocols such as V2X communication with vehicles and mobile devices (e.g., using sidelink communication), and/or using various Wide Area Network (WAN), Wireless Local Area Network (WLAN), and/or Personal Area Network (PAN) protocols to communicate over a wireless communication network. In an embodiment RSU(s) 925 may contain one or more processors 925A communicatively coupled to wireless transceiver 925E and memory, and may contain instructions and/or hardware to perform as a traffic control unit 925C and/or to provide and/or process environmental and roadside sensor information 925D or to act as a location reference for GNSS relative location between it and vehicles. In an embodiment, RSU(s) 925 may contain a network interface 925B (and/or a wireless transceiver 925E), which, in an embodiment, may communicate with external servers such as traffic optimization server 965, vehicle information server 955, and/or environmental data server 940. In an embodiment, wireless transceiver 925E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 925E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 1102.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 925 over a wireless link, and claimed subject matter is not limited in this respect.

RSU(s) 925 may receive location, status, GNSS and other sensor measurements, and capability information from vehicle A 980 and/or vehicle B 990 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging. RSU(s) 925 may utilize received information, via wireless transceiver 925E, from vehicle A 980, mobile device 900, and/or vehicle B 990, environmental and roadside sensors 925D, and network information and control messages from, for example, traffic control and optimization server 965 to coordinate and direct traffic flow and to provide environmental, vehicular, safety and announcement messages to vehicle A 980, vehicle B 990, and/or mobile device 900.

Processor 925A may be configured to operate a network interface 925B, in an embodiment, which may be connected via a backhaul to network 970, and which may be used, in an embodiment, to communicate and coordinate with various centralized servers such as a centralized traffic control and optimization server 965 that monitors and optimizes the flow of traffic in an area such as within a city or a section of a city or in a region. Network interface 925B may also be utilized for remote access to RSU(s) 925 for crowd sourcing of vehicle data, maintenance of the RSU(s) 925, and/or coordination with other RSU(s) 925 or other uses. RSU(s) 925 may have a processor 925A configured to operate traffic control unit 925C which may be configured to process data received from vehicles such as vehicle A 980 and vehicle B 990 such as location data, stopping distance data, road condition data, identification data and other information related to the status and location of nearby vehicles and environment. RSU(s) 925 may have a processor 925A configured to obtain data from environmental and roadside sensors 925D, which may include temperature, weather, camera, pressure sensors, road sensors (for car detection, for example), accident detection, movement detection, speed detection and other vehicle and environmental monitoring sensors.

In an embodiment, vehicle A 980 may also communicate with mobile device 900 using short range communication and personal networks such as Bluetooth, Wi-Fi or Zigbee or via V2X (e.g., CV2X/sidelink communications) or other vehicle-related communication protocols, for example, in an embodiment to access WAN and/or Wi-Fi networks and/or, in an embodiment, to obtain sensor and/or location measurements from mobile device 900, as well as information about pedestrian features and characteristics for a user of the mobile device 900. In an embodiment, vehicle A 980 may communicate with mobile device 900 using WAN related protocols through a WAN network, such as via WAN base station 920 or using Wi-Fi either directly peer to peer or via a Wi-Fi access point. Vehicle A 980, mobile device 900, and/or vehicle B 990 may communicate using various communication protocols. In an embodiment, vehicle A 980, mobile device 900, and/or vehicle B 990 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A may communicate over WAN networks using WAN protocols via base station 920 or with WLAN access point 930 using WLAN protocols such as Wi-Fi. A vehicle may also support wireless communication using a WLAN or PAN (such as Bluetooth or ZigBee), for example.

Vehicle A 980, mobile device 900, and/or vehicle B 990, in an embodiment, may contain one or more GNSS receivers such as GNSS receiver 880 for reception of GNSS signals 912, from GNSS satellites 910, for location determination, time acquisition and time maintenance. Various GNSS systems may be supported alone or in combination, using GNSS receiver 880 or other receiver, to receive signals from Beidou, Galileo, GLObal NAvigation Satellite System (GLONASS), and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 925, one or more WLAN access points 930 or one or more base stations 920. Various GNSS signals 912 may be utilized in conjunction with car sensors to determine location, velocity, proximity to other vehicles and mobile devices such as between vehicle A 980, mobile device 900, and vehicle B 990.

In an embodiment, vehicle A and/or vehicle B may access GNSS measurements and/or locations determined at least in part using GNSS as provided by mobile device 900, which, in an embodiment would also have GNSS, WAN, Wi-Fi and other communications receivers and/or transceivers. In an embodiment, vehicle A 980 and/or vehicle B 990 may access GNSS measurements (such as pseudorange measurements, Doppler measurements and satellite IDs) and/or locations determined at least in part using GNSS as provided by mobile device 900 as a fallback in case GNSS receiver 880 fails or provides less than a threshold level of location accuracy.

Vehicle A 980, mobile device 900, and/or Vehicle B 990 may access various servers on the network such as vehicle information server 955, route server 945, location server 960, map server 950, environmental data server 940, and pedestrian feature server 968.

Vehicle information server 955, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 955 may also provide information in regard to vehicle size, shape, capabilities, identification, ownership, occupancy, and/or determined location point (such as, for example, the location of the GNSS receiver) and the location of the car boundaries relative to the determined location point.

Route server 945, may receive current location and destination information, and provide routing information for the vehicle, map data, alternative route data and/or traffic and street conditions data.

Location server 960, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 950 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 940 may, in an embodiment, provide weather and/or road related information, traffic information, terrain information, and/or road quality & speed information and/or other pertinent environmental data.

Pedestrian feature server 968, in an embodiment, may provide information pedestrian feature information for one or more pedestrians associated with one or more mobile devices. The pedestrian feature may respond to requests from vehicles, and may identify pedestrian feature information based on certain access credentials and/or notifications from mobile devices to provide access to certain information.

In an embodiment, Vehicles 980 and 990 and mobile devices 900, in FIG. 9, may communicate over network 970 via various network access points such as WLAN access point 930 or wireless WAN base station 920 over network 970. Vehicles 980 and 990 and mobile devices 900 may also, in some embodiments, communicate directly between devices, between vehicles and device to vehicle and vehicle to device using various short range communications mechanisms to communicate directly without going over network 970, such as via Bluetooth, Zigbee and 5G new radio standards.

FIG. 10 comprises a functional block diagram of a vehicle 1000, according to an embodiment. As noted, a vehicle 1000 may comprise a V2X device 800. Accordingly, example hardware and/or software components for executing the blocks shown in FIG. 10 are illustrated in FIG. 8.

As shown in FIG. 10, vehicle 1000 may receive vehicle and environment information from vehicle external sensors 1002, vehicle internal sensors 1004, vehicle capabilities 1006, external wireless information such as the location of other vehicles and GNSS measurement information 1008 (from the environment, from other vehicles, from RSU(s), from system servers) and/or from vehicle motion state 1010 (describing current and/or future motion states). The received vehicle, sensor, and environment information may, in an embodiment, be processed in one or more processing unit(s) 810, DSP(s) 820, and memory 860 (shown in FIG. 8), connected and configured to provide external object sensing and classification, identification and extraction of external object (e.g., pedestrian) features, prediction and planning, and maneuver execution, as well as to determine and update V2X or other wireless data element values, including GNSS data element values, and to transmit, via a wireless communication interface 830, messaging including the determined data elements. The messaging and data elements may be sent and received via various means, protocols and standards, such as via Society of Automotive Engineers (SAE) or European Telecommunications Standards Institute (ETSI) CV2X messages and/or other wireless V2X protocols supported by wireless communication interface 830.

Inter-vehicle relative location determination block 1028 may be used to determine relative location of vehicles and/or mobile devices in an area of interest. In an embodiment, GNSS data is exchanged with vehicles, or other devices such as mobile devices and RSUs, to determine and/or verify and/or increase the accuracy of a relative location associated with other vehicles or devices. In one embodiment, determining vehicles, mobile devices, or other devices within an area of interest may utilize broadcast location information such as broadcast latitude and longitude received in messages from other vehicles, mobile devices, other devices and location information for vehicle 1000 to determine an approximate relative location and/or an approximate range between vehicles.

In an embodiment, other vehicle-related input sources, such as servers 955, 945, 960, 950, and 940, may provide information such as vehicle information, routing, location assistance, map data, pedestrian feature data, and environmental data and provide input on and/or complement and/or be used in conjunction with the other inputs, for example road location data, map data, driving condition data and other vehicle-related data inputs, used in conjunction with inter-vehicle maneuver coordination 1024 to determine maneuver execution 1026. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 950 may be utilized in conjunction with relative and/or absolute data from neighboring vehicles and/or from RSU(s) 925 to determine high confidence absolute location for a plurality of vehicles and relative location with respect to the road/map. For example, if vehicle A 980 has more high accuracy/high confidence location than other vehicles and other devices in communication with vehicle A 980, such as vehicle B 990 or mobile device 900, may use GNSS information for a highly accurate relative location and the highly accurate location from vehicle A 980 sent to vehicle B 990 or mobile device 900 to determine a highly accurate location for vehicle B 990 or mobile device 900, even if the systems of vehicle B 990 or mobile device 900 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 950 is accurate, the ability to propagate highly accurate location data from vehicle A 980 to surrounding vehicles and devices such as vehicle B 990 and mobile device 900 enables the surrounding vehicles and devices to also accurately determine their relative location versus the map data, even in otherwise troublesome signal/location environments. Vehicle information server 955 may provide vehicle information such as size, shape, and antenna location which may be utilized, for example, by vehicle A or other vehicles to determine not just the relative location between the GNSS receiver on vehicle A 980 and, for example, vehicle B 990, but also the distance between the closest points of Vehicle A 980 and Vehicle B 990. In an embodiment, traffic information from the traffic control and optimization server 965 may be utilized to determine overall path selection and rerouting, used in conjunction with route server 945 (in an embodiment). In an embodiment, environmental data server 940 may provide input on road conditions, black ice, snow, water on the road and other environmental conditions which may also impact the decisions and decision criteria in inter-vehicle maneuver coordination block 1024 and maneuver execution block 1026. For example, in icy or rainy conditions, the vehicle 1000 may execute and/or request increased inter-vehicle distance from adjacent vehicles or may choose route options that avoid road hazard conditions such as black ice and standing water.

Block 1028 may be implemented using various dedicated or generalized hardware and software, such as using processing unit(s) 810 and/or DSP 820 and memory 860 (again, as shown in FIG. 8) or, in an embodiment, in specialized hardware blocks such as dedicated sensor processing and/or vehicle messaging cores. According to some embodiments, the location of nearby vehicles may be determined through various means such as based on signal-based timing measurements such Round-Trip-Time, Time Of Arrival (TOA), signal strength of a broadcast signal for vehicles, and/or a distance determined based upon broadcast latitude and longitude from a neighboring vehicle and the current location of the vehicle. Additionally or alternatively, location of nearby vehicles may be determined from sensor measurements such as LIght Detection And Ranging (LIDAR), RAdio Detection And Ranging (RADAR), SOund Navigation And Ranging (SONAR), and camera measurements. In an embodiment, some or all of blocks 1002, 1004, 1006, 1008 and/or 1010 may have dedicated processing cores, for example, to improve performance and reduce measurement latency. In an embodiment, some or all of blocks 1002, 1004, 1006, 1008 and/or 1010 may share processing with block 1028.

Vehicle external sensors 1002 may comprise, in some embodiments, cameras, LIDAR, RADAR, SONAR, proximity sensors, rain sensors, weather sensors, GNSS receivers 880 and received data used with the sensors such as map data, environmental data, location, route and/or other vehicle information such as may be received from other vehicles, devices and servers such as, in an embodiment, map server 950, route server 945, vehicle information server 955, environmental data server 940, location server 960, pedestrian feature server 968, and/or from associated devices such as mobile device 900. In some embodiments, a mobile device 900 may be present in or near to the vehicle such as vehicle A 980. For example, in an embodiment, mobile device 900 may provide an additional source of GNSS measurements, may provide an additional source of motion sensor measurements, or may provide network access as a communication portal to a WAN, Wi-Fi or other network, and as a gateway to various information servers such as servers 940, 945, 950, 955, 960, and/or 965.

It is understood that the vehicle 1000 may contain one or a plurality of cameras. In an embodiment, a camera may be front facing, side facing, rear facing or adjustable in view (such as a rotatable camera). As shown in FIG. 11, for example, there may be multiple cameras 1106 facing the same plane. For example, the cameras 1106 and bumper-mounted camera at 1108 may comprise two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 1104 may be roof mounted and rotating or may be focused on a particular point of view (such as front facing, rear facing, side facing). LIDAR 1104 may be solid state or mechanical. Proximity sensors may be ultrasonic, RADAR-based, light-based (such as based on infrared range finding), and/or capacitive (surface touch oriented or capacitive detection of metallic bodies). Rain and Weather sensors may include various sensing capabilities and technologies such as barometric pressure sensors, moisture detectors, rain sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 1004 may comprise wheel sensors 1112 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 1004 and vehicle external sensors 1002 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 1028 to determine vehicle location. The car status values derived from measurements from internal and external sensors may be further combined with car status values and/or measurements from other sensor systems using a general or applications processor. For example, blocks 1028 and/or 1024 or may be implemented on a dedicated or a centralized processor to determine data element values for V2X messaging which may be sent utilizing wireless communication interface 830 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless communication interface 830 and antenna(s) 832.

In an embodiment, vehicle capabilities 1006 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive trains may share performance estimates for drive-performance related estimates such as breaking/stopping distance, turning radius, and acceleration performance. Vehicle performance estimates may also be obtained, for example, using external V2X input(s) 1008, over a wireless network from vehicular data servers on the network. This is particularly helpful to obtain information for vehicles that are not wireless capable and cannot provide vehicular information directly. In an embodiment, vehicle capabilities 1006 may also be influenced by car component status such as tire wear, tire brand capabilities, brake pad wear, brake brand and capabilities, and engine status. In an embodiment, vehicle capabilities 1006 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 1002 and/or vehicle internal sensors 1004, may be weighted more heavily and/or given preference in determining capability.

V2X vehicle sensing, prediction, planning execution 1012 handles the receipt and processing of information from blocks 1002, 1004, 1006, 1008 and 1010, via external object sensing and classification block 1014, in part utilizing sensor fusion and object classification block 1016 to correlate, corroborate and/or combine data from input blocks 1002, 1004, 1006, 1008 and 1010. Block 1014 external object sensing and classification determines objects present, performs object recognition to determine type of objects (car, truck, bicycle, motorcycle, pedestrian, animal, etc.), determines characteristics and distinguishing features of objects, and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 1014 may utilize GNSS measurements messages from other vehicles to determine the relative positioning to other vehicles. This output from block 1014 may be provided to prediction and planning block 1018, which determines detected objects and vehicles and their associated trajectory via block 1020 and determines vehicle maneuver and path planning in block 1022, the outputs of which are utilized in block 1026 vehicle maneuver execution either directly or via V2X inter-vehicle negotiation block 1024, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 11 is a perspective view of an example vehicle 1100, according to an embodiment, capable of communicating with other vehicles and/or V2X entities in the previously-described embodiments. Here, some of the components discussed with regard to FIG. 8 and earlier embodiments are shown. As illustrated and previously discussed, a vehicle 1100 can have camera(s) such as rear view mirror-mounted camera 1106, front fender-mounted camera (not shown), side mirror-mounted camera (not shown) and a rear camera (not shown, but typically on the trunk, hatch or rear bumper). Vehicle 1100 may also have LIDAR 1104, for detecting objects and measuring distances to those objects; LIDAR 1104 is often roof-mounted, however, if there are multiple LIDAR units 1104, they may be oriented around the front, rear and sides of the vehicle. Vehicle 1100 may have other various location-related systems such as a GNSS receiver 880 (typically located in the shark fin unit on the rear of the roof, as indicated), various wireless communication interface (such as WAN, WLAN, V2X; typically, but not necessarily, located in the shark fin) 1102, RADAR 1108 (typically in the front bumper), and SONAR 1110 (typically located on both sides of the vehicle, if present). Various wheel sensors 1112 and drive train sensors may also be present, such as tire pressure sensors, accelerometers, gyros, and wheel rotation detection and/or counters. In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. E.g., the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 11 is intended to provide exemplary locations of various sensors in an embodiment of a vehicle comprising a V2X device 800.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, RAM, a programmable ROM (PROM), erasable programmable ROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special-purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special-purpose computer or similar special-purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of linking a pedestrian and a mobile device by a vehicle, the method comprising:
   receiving, at the vehicle, a message from the mobile device, wherein the message is used to determine a first set of pedestrian features;
   obtaining, at the vehicle, an image;
   identifying whether the image contains one or more objects corresponding to one or more pedestrians; and
   determining, at the vehicle, whether the mobile device is associated with a pedestrian based on the first set of pedestrian features and the one or more objects corresponding to the one or more pedestrians.

2. The method of claim 1, wherein identifying whether the image contains one or more objects corresponding to one or more pedestrians comprises:
   detecting, at the vehicle, the one or more objects in the image;
   performing, at the vehicle, object recognition of the one or more objects; and
   in response to performing object recognition of the one or more objects, determining, at the vehicle, that the one or more objects correspond to one or more pedestrian.

3. The method of claim 2, wherein determining whether the mobile device is associated with a pedestrian based on the first set of pedestrian features and the one or more objects corresponding to the one or more pedestrians comprises:
   in response to determining that the one or more objects correspond to one or more pedestrians, extracting, by the vehicle, a second set of pedestrian features corresponding from the image; and
   comparing, at the vehicle, the first set of pedestrian features and the second set of pedestrian features.

4. The method of claim 3, wherein the first set of pedestrian features comprises first facial image data, and wherein the second set of pedestrian features comprises second facial image data.

5. The method of claim 1, further comprising:
   determining, at the vehicle, a pedestrian status of the pedestrian and a vehicle status of the vehicle;
   determining, at the vehicle, based on the pedestrian status and the vehicle status, that the pedestrian is in danger; and
   in response to determining that the pedestrian is in danger, sending, from the vehicle, a warning message to the mobile device.

6. The method of claim 1, wherein obtaining an image comprises receiving the image from a camera sensor, and wherein the message is a V2X message.

7. The method of claim 1, further comprising:
   sending, from the vehicle, to the mobile device, a request for the first set of pedestrian features, wherein the mobile device captures the first set of pedestrian features in response to receiving the request, and wherein the message received from the mobile device includes the first set of pedestrian features.

8. The method of claim 1, further comprising:
   sending, from the vehicle, to the mobile device, a request for the first set of pedestrian features, wherein the first set of pedestrian features is stored at the mobile device, wherein the mobile device retrieves the first set of pedestrian features in response to receiving the request, and wherein the message received from the mobile device includes the first set of pedestrian features.

9. The method of claim 1, further comprising:
   sending, from the vehicle, to the mobile device, a first request for the first set of pedestrian features;
   wherein the message received from the mobile device is received after sending the first request, and wherein the message includes access credentials for obtaining the first set of pedestrian features;
   in response to receiving the access credentials, sending, from the vehicle, to a server computer, a second request for the first set of pedestrian features, the second request including the access credentials; and after sending the first request, receiving, at the vehicle, from the server computer, a second message including the first set of pedestrian features.

10. A device comprising:
a wireless communication interface;
a memory; and
one or more processing units communicatively coupled with the memory and the wireless communication interface and configured to:
receive, via the wireless communication interface, a message from a mobile device, wherein the message is used to determine a first set of pedestrian features;
obtain an image;
identify whether the image contains one or more objects corresponding to one or more pedestrians; and
determine whether the mobile device is associated with a pedestrian based on the first set of pedestrian features and the one or more objects corresponding to the one or more pedestrians.

11. The device of claim 10, wherein identify whether the image contains one or more objects corresponding to one or more pedestrians comprises:
detect the one or more objects in the image;
perform object recognition of the one or more objects; and
in response to performing object recognition of the one or more objects, determine that the one or more objects correspond to one or more pedestrian.

12. The device of claim 11, wherein determine whether the mobile device is associated with a pedestrian based on the first set of pedestrian features and the one or more objects corresponding to the one or more pedestrians comprises:
in response to determining that the one or more objects correspond to one or more pedestrians, extract a second set of pedestrian features corresponding from the image; and
compare the first set of pedestrian features and the second set of pedestrian features.

13. The device of claim 12, wherein the first set of pedestrian features comprises first facial image data, and wherein the second set of pedestrian features comprises second facial image data.

14. The device of claim 10, wherein the one or more processing units are further configured to:
determine a pedestrian status of the pedestrian and a vehicle status of a vehicle;
determine, based on the pedestrian status and the vehicle status, that the pedestrian is in danger; and
in response to determining that the pedestrian is in danger, send a warning message to the mobile device.

15. The device of claim 10, wherein obtaining an image comprises receiving the image from a camera sensor, and wherein the message is a V2X message.

16. The device of claim 10, wherein the one or more processing units are further configured to:
send, to the mobile device, a request for the first set of pedestrian features, wherein the mobile device captures the first set of pedestrian features in response to receiving the request, and wherein the message received from the mobile device includes the first set of pedestrian features.

17. The device of claim 10, wherein the one or more processing units are further configured to:
send, to the mobile device, a request for the first set of pedestrian features, wherein the first set of pedestrian features is stored at the mobile device, wherein the mobile device retrieves the first set of pedestrian features in response to receiving the request, and wherein the message received from the mobile device includes the first set of pedestrian features.

18. The device of claim 10, wherein the one or more processing units are further configured to:
send, to the mobile device, a first request for the first set of pedestrian features; wherein the message received from the mobile device is received after sending the first request, and wherein the message includes access credentials for obtaining the first set of pedestrian features;
in response to receiving the access credentials, send, to a server computer, a second request for the first set of pedestrian features, the second request including the access credentials; and
after sending the first request, receive, from the server computer, a second message including the first set of pedestrian features.

19. A method of providing information for linking a pedestrian and a mobile device, the method comprising:
sending, from the mobile device, to a vehicle, a first message, wherein the first message is used to determine a first set of pedestrian features, wherein the vehicle obtains an image and identifies whether the image contains one or more objects corresponding to one or more pedestrians, wherein the vehicle determines whether the mobile device is associated with a pedestrian based on a comparison of the first set of pedestrian features and the one or more objects corresponding to the one or more pedestrians; and
receiving, at the mobile device, from the vehicle, a second message for the pedestrian.

20. The method of claim 19, wherein the vehicle determines a pedestrian status of the pedestrian and a vehicle status of the vehicle, wherein the vehicle determines, based on the pedestrian status and the vehicle status, that the pedestrian is in danger, and wherein the second message for the pedestrian is a warning message sent by the vehicle in response to determining that the pedestrian is in danger.

21. The method of claim 19, further comprising:
receiving, at the mobile device, from the vehicle, a request for the first set of pedestrian features; and
capturing, by the mobile device, the first set of pedestrian features in response to receiving the request, wherein the first message includes the first set of pedestrian features.

22. The method of claim 19, further comprising:
receiving, at the mobile device, from the vehicle, a request for the first set of pedestrian features; and
in response to receiving the request, retrieving, by the mobile device, the first set of pedestrian features, wherein the first set of pedestrian features is stored at the mobile device, and wherein the first message includes the first set of pedestrian features.

23. The method of claim 19, further comprising:
receiving, at the mobile device, from the vehicle, a first request for the first set of pedestrian features; and
generating or retrieving, by the mobile device, access credentials for obtaining the first set of pedestrian features, wherein the first message is sent to the vehicle in response to receiving the first request, and wherein the first message includes the access credentials, wherein the vehicle sends a second request for the first set of pedestrian features to a server computer, the second request including the access credentials, and wherein the vehicle receives the first set of pedestrian features from the server computer.

24. The method of claim 19, wherein the first message is a V2X message, and wherein the second message is a V2X message.

25. A non-transitory computer-readable medium comprising at least one instruction for causing a computer or processor to:
   receive a message from a mobile device, wherein the message is used to determine a first set of pedestrian features;
   obtain an image;
   identify whether the image contains one or more objects corresponding to one or more pedestrians; and
   determine whether the mobile device is associated with a pedestrian based on the first set of pedestrian features and the one or more objects corresponding to the one or more pedestrians.

26. The non-transitory computer-readable medium of claim 25, wherein identify whether the image contains one or more objects corresponding to one or more pedestrians comprises:
   detect the one or more objects in the image;
   perform object recognition of the one or more objects; and
   in response to performing object recognition of the one or more objects, determine that the one or more objects correspond to one or more pedestrian.

27. The non-transitory computer-readable medium of claim 26, wherein determine whether the mobile device is associated with a pedestrian based on the first set of pedestrian features and the one or more objects corresponding to the one or more pedestrians comprises:
   in response to determining that the one or more objects correspond to one or more pedestrians, extract a second set of pedestrian features corresponding from the image; and
   compare the first set of pedestrian features and the second set of pedestrian features.

28. The non-transitory computer-readable medium of claim 27, wherein the first set of pedestrian features comprises first facial image data, and wherein the second set of pedestrian features comprises second facial image data.

29. The non-transitory computer-readable medium of claim 25, wherein the at least one instruction is further configured to cause the computer or processor to:
   determine a pedestrian status of the pedestrian and a vehicle status of a vehicle;
   determine, based on the pedestrian status and the vehicle status, that the pedestrian is in danger; and
   in response to determining that the pedestrian is in danger, send a warning message to the mobile device.

30. The non-transitory computer-readable medium of claim 25, wherein obtaining an image comprises receiving the image from a camera sensor, and wherein the message is a V2X message.

* * * * *